(12) United States Patent
Hill

(10) Patent No.: US 7,251,041 B2
(45) Date of Patent: *Jul. 31, 2007

(54) SPATIAL FILTERING IN INTERFEROMETRY

(75) Inventor: Henry A. Hill, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/090,657

(22) Filed: Mar. 25, 2005

(65) Prior Publication Data

US 2005/0168755 A1 Aug. 4, 2005

Related U.S. Application Data

(63) Continuation of application No. 10/379,103, filed on Mar. 4, 2003, now Pat. No. 6,906,784.

(60) Provisional application No. 60/361,480, filed on Mar. 4, 2002.

(51) Int. Cl.
*G01B 11/02* (2006.01)
(52) U.S. Cl. .................................... 356/498; 356/500
(58) Field of Classification Search ................ 356/486, 356/487, 490–493, 498, 500, 508, 509
See application file for complete search history.

(56) References Cited

U.S. PATENT DOCUMENTS 4,575,245 A * 3/1986 Borde ........................ 356/450

| | | | |
|---|---|---|---|
| 4,711,573 A | 12/1987 | Wijntjes et al. | |
| 4,790,561 A | 12/1988 | Brown | |
| 4,802,765 A | 2/1989 | Young et al. | |
| 4,859,066 A | 8/1989 | Sommargren | |
| 4,881,816 A | 11/1989 | Zanoni | |
| 5,064,289 A | 11/1991 | Bockman | |
| 5,114,234 A | 5/1992 | Otsuka et al. | |
| 5,151,749 A | 9/1992 | Tanimoto et al. | |
| 5,187,543 A | 2/1993 | Ebert | |
| 5,331,400 A | 7/1994 | Wilkening et al. | |
| 5,408,318 A | 4/1995 | Slater | |
| 5,491,550 A | 2/1996 | Dabbs | |

(Continued)

FOREIGN PATENT DOCUMENTS

JP 7-351078 12/1995

(Continued)

OTHER PUBLICATIONS

Badami, V.G. et al. "Investigation of Nonlinearity in High Accuracy Heterodyne Laser Interferometry." *American Society for Precision Engineering 1997 Proceedings*, 16:pp. 153-166, 1997.

(Continued)

*Primary Examiner*—Gregory J. Toatley, Jr.
*Assistant Examiner*—Patrick Connolly
(74) *Attorney, Agent, or Firm*—Fish & Richardson P.C.

(57) ABSTRACT

Spatial filtering of beams in interferometry systems is used to reduce a displacement of the beams from an optical path corresponding to the path of the beams in an optimally-aligned system. By reducing beam displacement from the optical path, the system reduces the magnitude of beam shears and associated non-cyclic errors in linear and angular displacements measured by the interferometry systems.

30 Claims, 8 Drawing Sheets

U.S. PATENT DOCUMENTS

| | | |
|---|---|---|
| 5,548,403 A | 8/1996 | Sommargren |
| 5,663,793 A | 9/1997 | de Groot |
| 5,724,136 A | 3/1998 | Zanoni |
| 5,757,160 A | 5/1998 | Kreuzer |
| 5,764,391 A | 6/1998 | Kato et al. |
| 5,781,277 A | 7/1998 | Iwamoto |
| 5,790,253 A | 8/1998 | Kamiya |
| 5,801,832 A | 9/1998 | Van Den Brink |
| 6,008,902 A | 12/1999 | Rinn |
| 6,020,964 A | 2/2000 | Loopstra et al. |
| 6,046,792 A | 4/2000 | Van Der Werf et al. |
| 6,134,007 A | 10/2000 | Naraki et al. |
| 6,137,574 A | 10/2000 | Hill |
| 6,160,619 A | 12/2000 | Magome |
| 6,181,420 B1 | 1/2001 | Badami et al. |
| 6,201,609 B1 | 3/2001 | Hill et al. |
| 6,204,925 B1 | 3/2001 | Prikryl et al. |
| 6,208,424 B1 | 3/2001 | de Groot |
| 6,236,507 B1 | 5/2001 | Hill et al. |
| 6,246,481 B1 | 6/2001 | Hill |
| 6,252,668 B1 | 6/2001 | Hill |
| 6,304,318 B1 | 10/2001 | Matsumoto |
| 6,330,105 B1 | 12/2001 | Rozelle et al. |
| 6,384,899 B1 | 5/2002 | den Boef |
| 6,515,750 B1 | 2/2003 | Malyak et al. |
| 6,541,759 B1 | 4/2003 | Hill |
| 6,882,430 B2 * | 4/2005 | Hill ............................ 356/496 |
| 2002/0048026 A1 | 4/2002 | Isshiki et al. |
| 2002/0089671 A1 | 7/2002 | Hill |
| 2005/0030549 A1 * | 2/2005 | Hill ............................ 356/498 |

FOREIGN PATENT DOCUMENTS

| | | |
|---|---|---|
| JP | 8-117083 | 4/1996 |
| JP | 10 260009 | 9/1998 |

OTHER PUBLICATIONS

Bennett, S.J. "A Double-Passed Michelson Interferometer." *Optics Communications*, 4:6, pp. 428-430, 1972.

Bobroff, Norman. "Recent advances in displacement measuring interferometry." *Meas. Sci. Technol*, 4: pp. 907-926, 1993.

Hines, Brad et al. "Sub-Nanometer Laser Metrology—Some Techniques and Models." *European Southern Observatory, ESO Conference*, pp. 1195-1204, 1991.

Oka, K. et al. "Polarization heterodyne interferometry using another local oscillator beam." *Optics Communications*, 92: pp. 1-5, 1992.

Wu, Chien-Ming. Analytical modeling of the periodic nonlinearity in heterodyne interferometry. *Applied Optics*, 37:28 pp. 6696-6700, 1998.

* cited by examiner

SPATIAL FILTERING IN INTERFEROMETRY

CROSS-REFERENCE TO RELATED APPLICATIONS

This application is a continuation application of and claims priority to U.S. application Ser. No. 10/379,103, filed on Mar. 4, 2003, now U.S. Pat. No. 6,906,784 which claims priority to Provisional Patent Application No. 60/361,480, entitled "REDUCTION OF NON-CYCLIC ERRORS IN INTERFEROMETRY BY SPATIAL FILTERING," to Henry A. Hill, filed on Mar. 4, 2002.

BACKGROUND

This invention relates to interferometers, e.g., linear and angular displacement measuring and dispersion interferometers, that measure linear and angular displacements of a measurement object such as a mask stage or a wafer stage in a lithography scanner or stepper system, and also interferometers that monitor wavelength and determine intrinsic properties of gases.

Displacement measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam-splitter to direct the measurement and reference beams to the measurement and reference objects, respectively, and combine the reflected measurement and reference beams to form overlapping exit measurement and reference beams. The overlapping exit beams form an output beam that subsequently passes through a polarizer. The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams.

A detector measures the time-dependent intensity of the mixed beam and generates an electrical interference signal proportional to that intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2vnp/\lambda$, where v is the relative speed of the measurement and reference objects, $\lambda$ is the wavelength of the measurement and reference beams, n is the refractive index of the medium through which the light beams travel, e.g., air or vacuum, and p is the number of passes to the reference and-measurement objects. Changes in the phase of the measured interference signal correspond to changes in the relative position of the measurement object, e.g., a change in phase of $2\pi$ corresponds substantially to a distance change L of k $\lambda/(2np)$. Distance 2L is a round-trip distance change or the change in distance to and from a stage that includes the measurement object. In other words, the phase $\Phi$, ideally, is directly proportional to L, and can be expressed as $$\Phi = 2pkL, \text{ where} \qquad (1)$$
$$k = \frac{2\pi n}{\lambda}.$$

Unfortunately, the observable interference phase, $\tilde{\Phi}$, is not always identically equal to phase $\Phi$. Many interferometers include, for example, non-linearities such as those known as "cyclic errors." The cyclic errors can be expressed as contributions to the observable phase and/or the intensity of the measured interference signal and have a sinusoidal dependence on the change in for example optical path length 2pnL. In particular, a first order cyclic error in phase has for the example a sinusoidal dependence on $(4\pi pnL)/\lambda$ and a second order cyclic error in phase has for the example a sinusoidal dependence on $2(4\pi pnL)/\lambda$. Higher order cyclic errors can also be present as well as sub-harmonic cyclic errors and cyclic errors that have a sinusoidal dependence of other phase parameters of an interferometer system comprising detectors and signal processing electronics. Different techniques for quantifying such cyclic errors are described in commonly owned U.S. Pat. Nos. 6,137,574, 6,252,688, and 6,246,481 by Henry A. Hill.

There are in addition to the cyclic errors, non-cyclic non-linearities or non-cyclic errors. One example of a source of a non-cyclic error is the diffraction of optical beams in the measurement paths of an interferometer. Non-cyclic error due to diffraction has been determined for example by analysis of the behavior of a system such as found in the work of J.-P. Monchalin, M. J. Kelly, J. E. Thomas, N. A. Kurnit, A. Szöke, F. Zernike, P. H. Lee, and A. Javan, "Accurate Laser Wavelength Measurement With A Precision Two-Beam Scanning Michelson Interferometer," *Applied Optics*, 20(5), 736-757, 1981.

A second source of non-cyclic errors is the effect of "beam shearing" of optical beams across interferometer elements and the lateral shearing of reference and measurement beams one with respect to the other. Beam shears can be caused, for example, by a change in direction of propagation of the input beam to an interferometer or a change in orientation of the object mirror in a double pass plane mirror interferometer such as a differential plane mirror interferometer (DPMI) or a high stability plane mirror interferometer (HSPMI).

Accordingly, due to errors such as the aforementioned cyclic and non-cyclic errors, the observable interference phase typically includes contributions in addition to $\Phi$. Thus, the observable phase is more accurately expressed as $$\tilde{\Phi} = \Phi + \psi + \zeta, \qquad (2)$$

where $\psi$ and $\zeta$ are the contributions due to the cyclic and non-cyclic errors, respectively.

In displacement measuring applications, the observable phase is often assumed equal to 2pkL, which allows one to readily determine L from the measured phase. In many cases, this is a reasonable approximation, particularly where the contribution to due cyclic and/or non-cyclic errors are small, or the level of accuracy required by the application is relatively low. However, in applications demanding a high level of precision, cyclic and/or non-cyclic errors should be accounted for. For example, high precision displacement measurement requirements of integrated circuit micro-lithography fabrication have become very demanding, in part because of the small field limitations of imaging systems in steppers and scanners and in part because of the continuing reduction in the size of trace widths on wafers. The requirement of high precision displacement measurement with steppers and scanners is typically served with plane mirror interferometers with one of the external mirrors of the plane mirror interferometers attached to a stage mirror of the stepper or scanner. Because the wafer is typically not flat, the orientation of the wafer stage of a stepper or scanner must also be adjusted in one or more angular degrees of freedom to compensate for the non-flatness of the wafer at exposure sites on a wafer. The combination of the use of plane mirror interferometers and the change in one or more angular degrees of freedom is a source of lateral shear of optical beams across interferometer elements. Effects of beam shears of a reference beam and a measurement beam may be represented effectively as a common mode beam shear and a differential beam shear. The differential beam shear is the difference in lateral shear of reference and measurement and the common mode beam shear is the average lateral shear of the reference and measurement beams.

The cited source of lateral beam shear presents a potentially serious problem in distance measuring interferometry. For a measurement leg length of 1 meter, a typical value for a change in angular orientation of a stage mirror of 0.0005 radians, and a double-pass plane mirror interferometer, the relative lateral shear between the reference and the measurement components of the output beam of the interferometer is 2 millimeters. For a relative lateral shear of 2 millimeters, a beam diameter of 6 millimeters, and wavefront errors in the output beams of the order of $\lambda/20$, an error will be generated in the inferred distance measurement of $>/\sim 1$ nanometer. This error is a non-cyclic error and can pose a serious limitation to micro-lithographic applications of steppers and scanners in integrated circuit fabrication.

Wavefront errors are produced by imperfections in transmissive surfaces and imperfections in components, e.g., retroreflectors and phase retardation plates, and/or coupling into single-mode and multi-mode optical fibers that produce undesired deformations of wavefronts of beams. Non-cyclic errors are also introduced in coupling into different longitudinal modes of a multi-mode optical fiber as a result of beam shears at the coupling interface to the multi-mode optical fiber.

In dispersion measuring applications, optical path length measurements are made at multiple wavelengths, e.g., 532 nanometers and 1064 nanometers, and are used to measure dispersion of a gas in the measurement path of a distance measuring interferometer. The dispersion measurement can be used to convert a change in optical path length measured by the distance measuring interferometer into a corresponding change in physical length. Such a conversion can be important since changes in the measured optical path length can be caused by gas turbulence and/or by a change in the average density of the gas in the measurement arm even though the physical distance to the measurement object is unchanged.

When working to position-measurement accuracy of approximately one nanometer or better and for distance measuring interferometry using dispersion interferometry to correct for the effects of gas in the measuring path, the cited non-cyclic errors are amplified by the reciprocal dispersive power of the gas, $\Gamma$. For the Nb:YAG laser beam with a wavelength of 1064 nm and the frequency doubled Nb:YAG laser with a beam wavelength of 532 nanometers, $\Gamma \cong 75$. For the 633 nanometer HeNe laser beam and a second beam at 316 nanometer, $\Gamma \cong 25$. Thus, for high-accuracy interferometry (accuracy in the 1 nanometer regime or better) it is necessary to reduce the effect of the lateral beam shear induced non-cyclic errors in the dispersion interferometry by approximately two orders of magnitude beyond that required for the corresponding distance measuring interferometry, an accuracy in the 0.01 nanometer regime or better.

Both common mode and differential beam shear can further compromise the accuracy of an interferometer where the interferometer output beam is coupled into a fiber optic pick-up (FOP) to transport the interferometer output beam to a remotely located detector.

SUMMARY

Spatial filtering of beams in interferometry systems is used to reduce a displacement of the beams from an optical path corresponding to the path of the beams in an optimally-aligned system (e.g., where the measurement beam is normally incident on the measurement object). By reducing beam displacement from the optimal optical path, the system reduces a magnitude of beam shears and associated non-cyclic errors in linear and angular displacements measured by the interferometry systems. The spatial filtering can also reduce (e.g., eliminates) generation of non-cyclic errors that arise from Fresnel diffraction at, e.g., boundaries of optical elements. Interferometry systems implementing such spatial filtering can be advantageously incorporated into microlithography and beam writing applications.

In general, in a first aspect, the invention features a method including directing a first beam and a second beam along respective paths, wherein the first beam contacts a measurement object and changes in the orientation of the measurement object cause a displacement of the first beam from a nominal beam path, and wherein the first and second beams are derived from a common source, spatial filtering the first beam after it contacts the measurement object, wherein the spatial filtering reduces the displacement of the first beam from the optical path, and combining the first and second beams to form an output beam, wherein the output beam includes information about an optical path length difference between the first and second beams.

Embodiments of the method can include one or more of the following features and/or features of other aspects.

Displacement of the first beam from the nominal beam path can cause a measurable interferometric phase derived from the output beam to deviate from the expression $\Phi=pknL$, where p is an integer, k is the wavenumber of the output beam, and nL corresponds to the optical path length difference. The deviation can include a non-cyclic error term that varies in a nonperiodic way on the optical path length difference.

The nominal path can correspond to the first beam path when the measurement object is in a reference oriented. In some embodiments, the measurement beam is normally incident on the measurement object when the measurement object is in the reference orientation.

The first beam can be spatial filtered prior to or after being combined with the second beam.

In general, in another aspect, the invention features a method including directing a first beam and a second beam along respective paths, wherein the first beam contacts a measurement object (e.g., a plane mirror) and wherein the first and second beams are derived from a common source, spatial filtering the first beam after it contacts the measurement object, and combining the first and second beams to form an output beam, wherein the output beam includes information about an optical path length difference between the first and second beams.

Embodiments of the method can include one or more of the following features and/or features of other aspects. Changes in the orientation of the measurement object can cause a displacement of the first beam from a nominal beam path. The spatial filtering can reduce the displacement of the first beam from the nominal beam path. The nominal path can correspond to the first beam path when the measurement object is in a reference oriented. In some embodiments, the first beam can be normally incident on the measurement object when the measurement object is in the reference orientation.

The displacement of the first beam from the nominal beam path can cause a measurable interferometric phase derived from the output beam to deviate from the expression $\Phi=pknL$, where p is an integer, k is the wavenumber of the output beam, and nL corresponds to the optical path length difference. The deviation can include a non-cyclic error term that varies in a nonperiodic way on the optical path length difference.

The first and second beams can be directed along separate paths by an interferometer (e.g., a high stability plane mirror interferometer). The first beam can contact the measurement object more than once (e.g., twice).

Spatial filtering can include focusing the first beam onto a pinhole aperture. The focused beam exiting the pinhole aperture can be collimated.

The method can also include detecting the measurable interference phase and determining information related to the optical path length difference based on the detected phase. Spatial filtering can reduce deviations of the phase from the expression $\Phi=pknL$. In some embodiments, spatial filtering reduces the contribution of a non-linear non-cyclic error term to the measurable phase.

The first beam is spatial filtered prior to or after being combined with the second beam.

In general, in a further aspect, the invention features a method including directing a first beam and a second beam along respective paths, wherein the first and second beams are derived from a common source, combining the first and second beams to form an output beam, wherein the output beam comprises information about an optical path length difference between the first and second beams, and spatial filtering the first beam, wherein the spatial filtering reduces deviations of a measurable interferometric phase derived from the output beam from the expression $\Phi=pknL$, where p is an integer, k is the wavenumber of the output beam, and nL corresponds to the optical path length difference.

Embodiments of the method can include one or more features of other aspects.

In general, in a further aspect, the invention features an apparatus, including an interferometer which during operation directs a first beam and a second beam along respective paths and then combines the first and second beams to produce an output beam, wherein the first beam contacts a measurement object and changes in the orientation of the measurement object cause a displacement of the first beam from a nominal beam path, and wherein the output beam comprises information about an optical path length difference between the first and second beams. The interferometry system also includes a spatial filter positioned in the path of the first beam, wherein the spatial filtering reduces the displacement of the first beam from the nominal beam path.

Embodiments of the apparatus can include one or more of the following features and/or features of other aspects.

The apparatus can include a detector positioned to detect an intensity of the output beam. Additionally, the apparatus can include an electronic controller coupled to the detector, which during operation monitors an interference phase related to the optical path length difference between the first and second beams.

The displacement of the first beam from the nominal beam path can cause a measurable interferometric phase derived from the output beam to deviate from the expression $\Phi=pknL$, where p is an integer, k is the wavenumber of the output beam, and nL corresponds to the optical path length difference. The deviation can include a non-cyclic error term that varies in a nonperiodic way on the optical path length difference.

The interferometer can direct the first beam to contact the measurement object more than once (e.g., twice). In some embodiments, the interferometer is a high stability plane mirror interferometer.

The spatial filter can include a focusing lens and a pinhole aperture, and during operation the focusing lens focuses the first beam onto the pinhole aperture. The spatial filter can further include a collimating lens, which during operation collimates the focused beam exiting the pinhole aperture.

The nominal path can correspond to the path of the first beam when the measurement object is in a reference orientation. In some embodiments, the first beam is normally incident on the measurement object when the measurement object is in the reference orientation.

The spatial filter can be positioned in the path of the output beam.

The apparatus can include a light source which during operation generates an input beam from which the interferometer derives the first and second beams.

In a further aspect, the invention features a lithography system for use in fabricating integrated circuits on a wafer. The system includes a stage for supporting the wafer, an illumination system for imaging spatially patterned radiation onto the wafer, a positioning system for adjusting the position of the stage relative to the imaged radiation, and the foregoing apparatus for monitoring the position of the wafer relative to the imaged radiation.

In another aspect, the invention features a lithography system for use in fabricating integrated circuits on a wafer. The system includes a stage for supporting the wafer, and an illumination system including a radiation source, a mask, a positioning system, a lens assembly, and the foregoing apparatus, wherein during operation the source directs radiation through the mask to produce spatially patterned radiation, the positioning system adjusts the position of the mask relative to the radiation from the source, the lens assembly images the spatially patterned radiation onto the wafer, and the apparatus monitors the position of the mask relative to the radiation from the source.

In another aspect, the invention features a beam writing system for use in fabricating a lithography mask. The system includes a source providing a write beam to pattern a substrate, a stage supporting the substrate, a beam directing assembly for delivering the write beam to the substrate, a positioning system for positioning the stage and beam directing assembly relative one another, and the foregoing apparatus for monitoring the position of the stage relative to the beam directing assembly.

In general, in a further aspect, the invention features a method for monitoring the position of a measurement object, including directing a first beam and a second beam along respective paths, wherein the first beam contacts the measurement object and wherein the first and second beams are derived from a common source, spatial filtering the first beam after it contacts the measurement object, combining the first and second beams to form an output beam either before or after spatial filtering the first beam, detecting a phase of the output beam related to an optical path length difference between the first and second beams, and monitoring the position of the measurement object based on the detected phase.

Embodiments of the method can include one or more of the features of other aspects.

In a further aspect, the invention features a lithography method for use in fabricating integrated circuits on a wafer that includes supporting the wafer on a moveable stage, imaging spatially patterned radiation onto the wafer, adjusting the position of the stage, and monitoring the position of the stage using the foregoing method.

In another aspect, the invention features a lithography method for use in the fabrication of integrated circuits including directing input radiation through a mask to produce spatially patterned radiation, positioning the mask relative to the input radiation, monitoring the position of the mask relative to the input radiation using the foregoing method, and imaging the spatially patterned radiation onto a wafer.

In yet a farther aspect, the invention features a lithography method for fabricating integrated circuits on a wafer including positioning a first component of a lithography system relative to a second component of a lithography system to expose the wafer to spatially patterned radiation, and monitoring the position of the first component relative to the second component using the foregoing method.

In another aspect, the invention features a method for fabricating integrated circuits including the foregoing lithography method(s) and/or using the foregoing lithography system(s).

In another aspect, the invention features a method for fabricating a lithography mask including directing a write beam to a substrate to pattern the substrate, positioning the substrate relative to the write beam, and monitoring the position of the substrate relative to the write beam using the foregoing method.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

Other features, objects, and advantages of the invention will be apparent from the following detailed description.

DESCRIPTION OF DRAWINGS

FIG. 2(*b*) and FIG. 2(*c*) are diagrams illustrating a beam profile before and after spatial filtering, respectively.

FIGS. 5(*b*)-5(*d*) are schematic diagrams of afocal systems.

DETAILED DESCRIPTION

Figure 1:
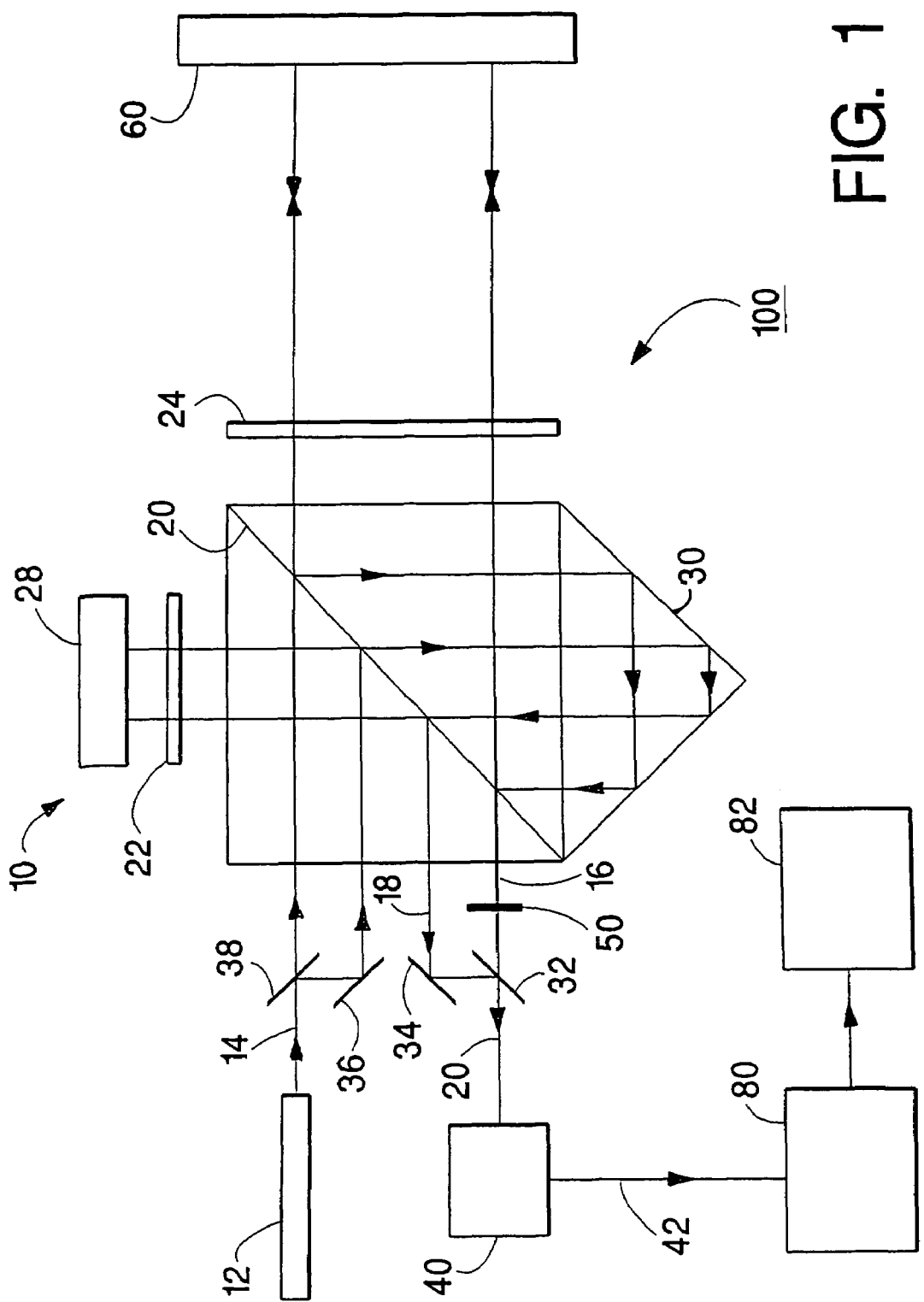
FIG. 1 is a schematic diagram of an interferometry system including a spatial filter.

Referring to FIG. 1, an interferometry system 100 includes a high-stability plane mirror interferometer (HSPMI) indicated by numeral 10 and plane mirror measurement object 60. Interferometer 10 includes a polarizing beam splitter 20, a reference mirror 28, a retroreflector 30, and a pair of quarter wave plates 22 and 24.

During operation of interferometry system 100, a source 12 directs an input beam 14 to interferometer 10. Input beam 14 includes two orthogonally polarized components that have different frequencies. The two frequency components of input beam 14 can be generated in source 12 by can be produced, for example, by laser Zeeman splitting, by acousto-optical modulation, or internal to the laser using birefringent elements or the like. Prior to contacting interferometer 10, input beam 14 is incident on polarization beam-splitter 38, which transmits a measurement component of input beam 14 and reflects a second component. The first and second components are referred to as the measurement and reference beams, respectively. The reference and measurement beams are polarized orthogonal and parallel to the plane of FIG. 1, respectively. A mirror 36 directs the reference beam along a path parallel to the measurement beam towards interferometer 10.

Within interferometer 10, the reference beam contacts a second polarizing beam splitter 20, which directs the reference beam to reflect from a reference mirror 28. Prior to and after reflecting from reference mirror 28, the reference beam passes through a quarter wave plate 22. Quarter wave plate 22 retards the reference beam's polarization so that the reflected reference beam is transmitted by polarizing beam splitter 20. A retroreflector directs the once-reflected reference beam back towards quarter wave plate 22 and reference mirror 28, which reflects the reference beam back towards polarizing beam splitter 20. The reference beam's double pass through quarter wave plate 22 transforms its polarization so that it is reflected by polarizing beam splitter 20, exiting interferometer 10 as output reference beam 18.

The measurement beam is initially transmitted by polarizing beam splitter 20 to reflect from measurement object 60, passing through a quarter wave plate 24 both before and after reflection resulting in the beam's polarization being rotated by 90°. The reflected measurement beam contacts polarizing beam splitter 20, which now reflects the measurement beam toward retroreflector 30. Retroreflector 30 directs the measurement beam back towards polarizing beam splitter 20, which reflects the beam towards measurement object 60. Reflecting from measurement object 60 and passing through quarter wave plate 24 twice results in another 90° rotation of the measurement beam polarization. Accordingly, polarizing beam splitter 20 now transmits the measurement beam, which exits interferometer 10 as output measurement beam 16.

Variations in the orientation of measurement object 60 cause a displacement of output measurement beam 16 from a nominal measurement beam path. The nominal measurement beam path is defined as the path the measurement beam traverses when it is normally incidence on measurement object 60.

A mirror 34 and a polarizing beam splitter 32 combine output beams 16 and 18 into a single, substantially coextensive output beam 20. Interferometer 10 introduces a phase $\Phi_1$ between the reference and measurement beams of output beam 20. Phase $\Phi_1$ includes effects of a linear displacement of plane mirror 60, cyclic errors, and non-cyclic errors. Phase $\Phi_1$ is measured as the phase of electrical interference signal 42 by electronic processor 80 and computer 82. Phase $\Phi_1$ includes the cyclic errors and non-cyclic errors according to the formula $$\Phi_1 = 4k\left[n_1 L_1 \cos^2\beta_1 + a_1 n_{10} \sin^2\left(\frac{\beta_1}{n_{10}}\right)\right] + \psi_1 + \zeta_1 \quad (3)$$

where $2L_1$ is the relative round trip physical length of the measurement and reference beam paths between interferometer 10 and measurement object 60, $\alpha_1$ is the physical distance between the apex of retroreflector 30 and the center of polarizing beam splitter 20, wavenumber $k=2\pi/\lambda$ for wavelength $\lambda$ of beam 14, $n_1$ is the index of refraction of a medium in the measurement path, $n_{10}$ is the index of refraction of the optical elements of interferometer 10, $\beta_1$ is the magnitude of an angular change in orientation of plane mirror 60 from a null position, $\psi_1$ is function representing the cyclic errors, and $\zeta_1$ is a function representing the non-cyclic errors.

Figure 2A:
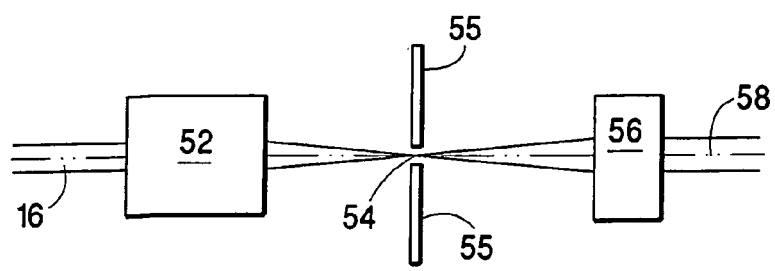
FIG. 2(*a*) is a schematic diagram of a spatial filter.

In order to reduce the magnitude of non-cyclic error function $\zeta_1$, measurement beam 16 is directed through a spatial filter 50 located in the measurement beam path between polarizing beam splitters 20 and 32. Referring to FIG. 2(a), spatial filter 50 includes a focusing lens 52 (e.g., a single or compound lens), a stop 55 providing a pinhole aperture 54, and a collimating lens 56 (e.g., a single or compound lens). Lens 52 focuses measurement beam 16 to pinhole aperture 54. Lens 54 collimates the focused beam exiting pinhole aperture 54. Spatial filter 50 has an axis 58, corresponding to the optical axis of lens 52. The center of pinhole 54 and the optical axis of lens 56 are coincident with axis 58. Typically, spatial filter 50 also includes one or more alignment components (e.g., x-y-z stages) for accurately positioning the lenses with respect to the pinhole aperture and the spatial filter relative to the interferometer. Imperfections (e.g., spatial noise including rays not substantially parallel to axis 58) non-paraxial rays or wavefront variations due to Fresnel diffraction of the measurement beam from an optical component edge) in output measurement beam 16 are defocused in an annulus about axis 58. The pinhole blocks most of this noise. Accordingly, the collimated beam exiting the spatial filter is substantially free of these imperfections.

In some embodiments, the diameter of pinhole aperture 54 is selected based on the diameter, D, and wavelength, $\lambda$, of the measurement beam, and the focal length of focusing lens 52, f. Focusing lens 52 focuses the measurement beam to a spot diameter given by $$\frac{1.27 \cdot \lambda \cdot f}{D}.$$

The diameter of pinhole aperture 54 can be selected based on the spot diameter. For example, the pinhole aperture diameter can be chosen to be equal to or greater than the beam spot diameter (e.g., 1.5 or twice the beam spot diameter). In some embodiments, the pinhole aperture diameter is approximately on the order of the wavelength of the measurement beam (e.g., 0.5 $\lambda$<pinhole aperture diameter<10 $\lambda$). In embodiments where the measurement beam diameter is on the order of a few to several millimeters (e.g., between about one and 20 millimeters, such as about five millimeters), the pinhole aperture diameter can be between about 0.5 and 20 microns (e.g., between about one and 10 microns, such as about 5 microns).

Spatial filter 50 is oriented relative to interferometer 10 so that axis 58 is coincident with the nominal measurement beam path (i.e., the beam path corresponding to the measurement beam being normally incident on measurement object 60. Thus, spatial filter 50 is positioned so that when measurement beam 16 is coincident with axis 58, then the measurement beam optimally overlaps with reference beam in output beam 20. Accordingly, axis 58 corresponds to a measurement beam path for which there is no differential beam shear.

Figure 2B:
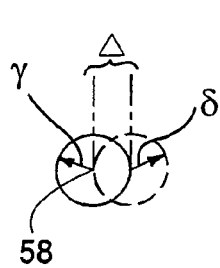
Figure 2C:
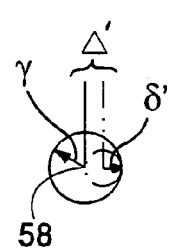

In addition to reducing spatial noise in the measurement beam, spatial filter 50 also reduces a displacement of measurement beam 16 from axis 58. This reduction occurs because the transmission properties of spatial filter 50 vary as a function of a rays distance from the spatial filter's axis. Typically, transmission is greatest for on-axis rays. For rays greater than a threshold distance off-axis, transmission can be zero. The effect of reduced off-axis transmission on the measurement beam is illustrated in FIG. 2(b) and FIG. 2(c). Referring specifically to FIG. 2(b), a spatial filter has non-zero transmission for rays within a radius $\gamma$ from axis 58. A measurement beam having a radius $\delta$, and displaced from axis 58 by an amount $\Delta$, is incident on the spatial filter. Referring now to FIG. 2(c), due to the transmission properties of the spatial filter, only rays less than $\gamma$ away from axis 58 are transmitted. Thus, the spatial filter reshapes the measurement beam profile, which exits the spatial filter with a radius $\delta'$, and is displaced by an amount $\Delta'$ from axis 58, where $\Delta'<\Delta$.

In the foregoing example, beam displacement from axis 58 is measured from the geometric center of the beam profile. However, in other embodiments, other measures of beam displacement can be used, e.g., from the axis to the point of highest beam intensity.

The amount by which the spatial filter reduces the beam displacement from axis 58 can vary depending on the characteristics of the spatial filter (e.g., the focal length of lens 52 and/or the pinhole aperture diameter). In some embodiments, the the spatial filter reduces the beam displacement from axis 58 by more than about 20 percent (e.g., more than 35 percent, such as 50 percent or more).

The transmission properties of spatial filter 50 can be represented by a transmission function $T_1(\xi, \eta)$ where $\xi$ and $\eta$ are orthogonal coordinates in the plane of spatial filter 50 and parallel and orthogonal to the plane of FIG. 2(a), respectively.

In some embodiments, transmission function $T_1(\xi, \eta)$ can be approximated by a bell shape or Gaussian shape in going from a central region to an edge of spatial filter 50 to reduce or eliminate the generation of Fresnel diffraction that can produce non-cyclic errors in electrical interference signal 42. Transmission function $T_1(\xi, \eta)$ may exhibit symmetry properties such as azimuthal symmetry about a center, non-symmetric azimuthal properties about a center, an inversion symmetry, e.g., $T_1(\xi, \eta) = T_1(-\xi, -\eta)$ or non-symmetric properties on reflection about $\xi=0$ and/or $\eta=0$.

An example is presented wherein the amplitude profile of the output reference and measurement beams from polarizing beam splitter 20 are Gaussian and transmission function $T_1(\xi, \eta)$ exhibits inversion symmetry. Transmission function $T_1(\xi, \eta)$ is further represented as a function that is Gaussian in coordinates $\xi$ and $\eta$ with different width parameters, e.g., $$T_1(\xi, \eta) = \exp\left[-2\left(\frac{\xi^2}{u_F^2} + \frac{\eta^2}{v_F^2}\right) + i\varphi_1(\xi, \eta)\right] \quad (4)$$

where $u_F$ and $v_F$ are the radii that $T_1(\xi, \eta)^{1/2}$ has values of $1/e$ in the $(\xi, 0)$ and $(0, \eta)$ planes, respectively, and $\varphi_1(\xi, \eta)$ if a phase shift introduced by spatial filter 50. The amplitude profiles $A_{1,r}$ and $A_{1,m}$ of the output reference and measurement beams 18 and 16, respectively, at spatial filter 50 are expressed as $$A_{1,r}(\xi, \eta) = A_0 \exp\left[-\left(\frac{\xi}{u_B}\right)^2 - \left(\frac{\eta}{v_B}\right)^2\right], \quad (5)$$

$$A_{1,m}(\xi, \eta) = A_0 \exp\left\{-\frac{(\xi - b_{1,\xi})^2}{u_B^2} - \frac{(\eta - b_{1,\eta})^2}{v_B^2}\right\} \quad (6)$$

where $u_B$ and $v_B$ are the radii that $A_{1,r}(\xi, 72)/A_0$ and $A_{1,m}(\xi, \eta)/A_0$ each have a values of $1/e$ in the $(\xi, 0)$ and $(0, \eta)$ planes, respectively, and $b_{1,\xi}$ and $b_{1,\eta}$ are displacements, i.e., beam shears of the output measurement beam 16 with respect to spatial filter 50 in the $\xi$ and $\eta$ coordinates, respectively. The amplitude of the reference and measurement beams have been selected to have the same amplitudes $A_0$ so as to illustrate in a simple example features of the invention without departing from the scope and spirit of the present invention.

Beam shears $b_{1,\xi}$ and $b_{1,\eta}$ for the first embodiment are the beam shears that would be exhibited at detector 40 if spatial filter 50 were removed and are $$b_{1,\xi} = 4L_1\theta_{1,\xi}, \quad (7)$$

$$b_{1,\eta} = 4L_1\theta_{1,\eta}, \quad (8)$$

where $\theta_{1,\xi}$ and $\theta_{1,\eta}$ are the changes in orientation of plane mirror 60 in the plane and orthogonal to the plane, respectively, of FIG. 1.

The amplitude $A_{1,m,T}(\xi, \eta)$ of the measurement beam transmitted by spatial filter 50 is given by the product of Equations (4) and (6) as $$A_{1,m,T}(\xi, \eta) = T^{\frac{1}{2}}(\xi, \eta) A_{1,m}(\xi, \eta) = A_0 \exp \quad (9)$$

$$\left\{-\left[\xi - \left(\frac{u_{B,F}^2}{u_B^2}\right)b_{1,\xi}\right]^2 \left(\frac{1}{u_{B,F}}\right)^2 - \left(\frac{u_{B,F}}{u_F}\right)^2\left(\frac{b_{1,\xi}}{u_B}\right)^2 - \right.$$

$$\left.\left[\eta - \left(\frac{v_{B,F}^2}{v_B^2}\right)b_{1,\eta}\right]^2 \left(\frac{1}{v_{B,F}}\right)^2 - \left(\frac{v_{B,F}}{v_F}\right)^2\left(\frac{b_{1,\eta}}{v_B}\right)^2 + i\frac{\varphi_1}{2}\right\}$$

where $$\frac{1}{u_{B,F}^2} = \frac{1}{u_B^2} + \frac{1}{u_F^2}, \quad (10)$$

$$\frac{1}{v_{B,F}^2} = \frac{1}{v_B^2} + \frac{1}{v_F^2}, \quad (11)$$

and $\phi_1$ is the value of $\phi_1$ for beam shears $b_{1,\xi}$ and $b_{1,\eta}$.

The output measurement beam of beam 20 exhibits an important property. It is evident from Equation (9) that the beam shears $b_{1,\xi,T}$ and $b_{1,\eta,T}$ of the measurement beam of beam 20 are reduced relative to the corresponding beam shears of the measurement beam of beam 16 according to the formulae $$b_{1,\xi,T} = \frac{u_{B,F}^2}{u_B^2} b_{1,\xi}, \quad (12)$$

$$b_{1,\eta,T} = \frac{v_{B,F}^2}{v_B^2} b_{1,\eta}, \quad (13)$$

respectively. The reduction of the beam shears of the measurement beam of beam 20 reduces the magnitude of non-cyclic errors that would otherwise be present. The net effect of reduction of the magnitude of non-cyclic errors will depend on the sensitivity of the non-cyclic errors to beam shear. For example, a non-cyclic error that is proportional to the cube of the beam shear will be reduced by a factor of 8 for $(u_{B,F}/u_B)^2 = \frac{1}{2}$.

The amplitude $A_{1,H}$ of electrical interference signal 42 is obtained by integrating the product of amplitudes $A_{1,r}$ and $A_{1,m,T}$ over $\xi$ and $\eta$ coordinates wherein the amplitudes are given by Equations (5) and (9). The resulting expression for $A_{1,H}$ is $$A_{1,H} = A_{1,H,0}\left(\frac{\sqrt{2}\,u_{2B,F}}{u_B}\right)\left(\frac{\sqrt{2}\,v_{2B,F}}{v_B}\right) \times \quad (14)$$

$$\exp\left[-\left(\frac{u_{2B,F}}{u_{B,F}}\right)^2\left(\frac{b_\xi}{u_B}\right)^2 - \left(\frac{v_{2B,F}}{v_{B,F}}\right)^2\left(\frac{b_\eta}{v_B}\right)^2\right]$$

where $$\frac{1}{u_{2B,F}^2} = \frac{1}{u_B^2} + \frac{1}{u_{B,F}^2}, \quad (15)$$

$$\frac{1}{v_{2B,F}^2} = \frac{2}{v_B^2} + \frac{1}{v_{B,F}^2}, \quad (16)$$

and $A_{1,H,0}$ is the amplitude of the electrical interference signal for the case $u_F = v_F = \infty$. The effect of $\phi_1$ on amplitude $A_{1,H}$ has been set to zero in obtaining Equation (14) to illustrate the effect of the spatial filter on the interferometry system.

The value for the reduction of beam shear of the measurement beam of beam 20 and the amplitude ratio $A_{1,H}/A_{1,H,0}$ for the case of $u_F = u_F$, $v_F = \infty$ using Equations (12), (13), and (14) are $$b_{1,\xi,T} = \left(\frac{1}{2}\right)b_{1,\xi}, \tag{17}$$

$$b_{1,\eta,T} = b_{1,\eta}, \tag{18}$$

$$\left(\frac{A_{1,H}}{A_{1,H,0}}\right) = \left(\frac{2}{3}\right)^{\frac{1}{2}} \exp\left[-\left(\frac{2}{3}\right)\left(\frac{b_\xi}{u_B}\right)^2 - \left(\frac{b_\eta}{v_B}\right)^2\right]. \tag{19}$$

The values for the reduction of beam shear of the measurement beam of beam 20 and the amplitude ratio $A_{1,H}/A_{1,H,0}$ for the case of $u_B=u_F=v_B=v_F$ using Equations (12), (13), and (14) are $$b_{1,\xi,T} = \left(\frac{1}{2}\right)b_{1,\xi}, \tag{20}$$

$$b_{1,\eta,T} = \left(\frac{1}{2}\right)b_{1,\eta}, \tag{21}$$

$$\left(\frac{A_{1,H}}{A_{1,H,0}}\right) = \left(\frac{2}{3}\right)\exp\left[-\left(\frac{2}{3}\right)\left(\frac{b_\xi}{u_B}\right)^2 - \left(\frac{2}{3}\right)\left(\frac{b_\eta}{v_B}\right)^2\right]. \tag{22}$$

The amplitude of electrical interference signal 42 is reduced by the introduction of spatial filter 50 as shown in Equations (14), (19), and (22). However, the variation of the amplitude of electrical interference signal 42 with beam shear is reduced as further evident in Equations (14), (19), and (22). Because of the reduced variation of the amplitude, the amplitude of the electrical interference signal 42 for large beam shears is approximately the same as the amplitude that would be obtained for the case of no spatial filtering. A reduction of the variation of the amplitude can be beneficial because of a less dynamic range required in detector 40 and electronic processor 80 without a degradation of performance with respect to signal-to-noise ratio.

Spatial filter 50 can also reduce (e.g., eliminate) generation of Fresnel fringes that would otherwise occur due to a beam being sheared and diffracted at an edge of an optical element. Reduction of the effects of Fresnel fringes is most effective when spatial filter 50 is located close to the optical element with the edge, i.e., close in a direction orthogonal to the plane of spatial filter 50. In some embodiments, spatial filter 50 can be located less than about 10 centimeters from interferometer 10 (e.g., less than about five centimeters, such as about three centimeters or less).

In some embodiments, it may be desirable to place the spatial filter at other locations in the interferometry system. Alternatively, or additionally, it may be beneficial to place two or more spatial filters in the interferometry system. Additional spatial filters can increase effectiveness in elimination of generation of Fresnel fringes such as when there are two or optical elements that have edges that would otherwise generate Fresnel fringes.

Figure 3:
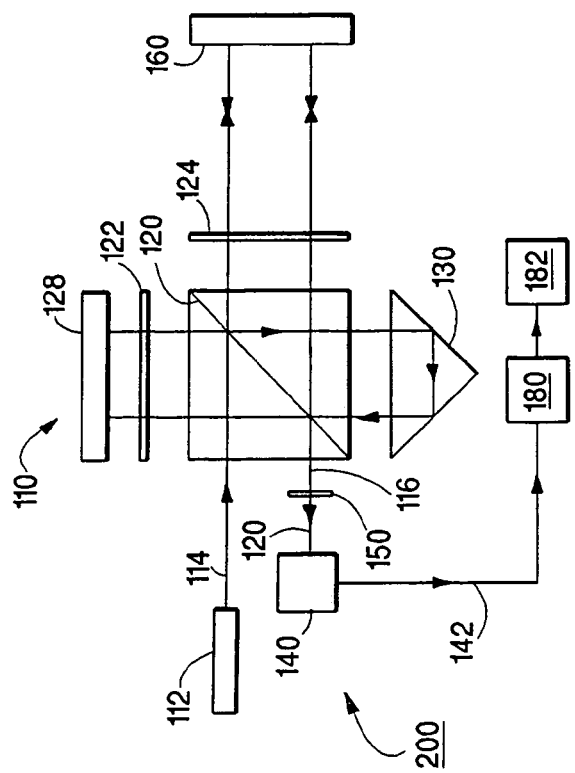
FIG. 3 is a schematic diagram of another interferometry system including a spatial filter.

An example of placing the spatial filter in a different position is shown schematically in FIG. 3, which shows an interferometry system 200 having a spatial filter 150 placed in the path of an output beam 116 that includes both the reference and measurement beams. System 200 includes a HSPMI indicated by numeral 110 with plane mirror measurement object 160. HSPMI 110 includes reference mirror 128, retroreflector 130, polarizing beam splitter 120, and quarter waveplates 122 and 124. HSPMI 110 splits an input beam 114 from a source 112 into a measurement component beam and a reference component beam. HSPMI directs the measurement component beam to reflect from measurement object 160 twice, and directs the reference component beam to reflect from reference mirror 128 twice before combining the measurement and reference component beams to form output beam 116. A spatial filter 150 is located in the path of output beam 116. The output beam exiting spatial filter 150 is denoted by numeral 120.

To illustrate the effect of spatial filter 150 on the output beam, assume the spatial filter has a Gaussian transmission function and that both the measurement and reference beams in output beam 116 have Gaussian profiles. Amplitudes $A_{2,r,T}(\xi,\eta)$ and $A_{2,m,T}(\xi,\eta)$ of the reference and measurement beams, respectively, of transmitted output beam 120 are $$A_{2,r,T}(\xi,\eta) = T(\xi,\eta)^{\frac{1}{2}} A_r(\xi,\eta) = A_0 \exp\left\{-\left(\frac{\xi}{u_B}\right)^2 - \left(\frac{\eta}{v_B}\right)^2 + i\frac{\varphi_{2,r}}{2}\right\}, \tag{23}$$

$$A_{2,m,T}(\xi,\eta) = T(\xi,\eta)^{\frac{1}{2}} A_{1,m}(\xi,\eta) =$$

$$A_0 \exp\left\{\begin{array}{l}-\left[\xi - \left(\frac{u_{B,F}^2}{u_B^2}\right)b_{2,\xi}\right]^2 \left(\frac{1}{u_{B,F}}\right)^2 - \left(\frac{u_{B,F}}{u_F}\right)^2 \left(\frac{b_{2,\xi}}{u_B}\right)^2 - \\ \left[\eta - \left(\frac{v_{B,F}^2}{v_B^2}\right)b_{2,\eta}\right]^2 \left(\frac{1}{v_{B,F}}\right)^2 - \left(\frac{v_{B,F}}{v_F}\right)^2 \left(\frac{b_{2,\eta}}{v_B}\right)^2 + i\frac{\varphi_{2,m}}{2}\end{array}\right\}, \tag{24}$$

where $\phi_{2,r}$ and $\phi_{2,m}$ are the values of phase shifts introduced by spatial filter 150 for the reference and measurement beams, respectively, of output beam 120.

Beam shears $b_{2,\xi}$ and $b_{2,\eta}$ for the second embodiment are the beam shears that would be exhibited at detector 140 if spatial filter 150 were removed and are $$b_{2,\xi} = 4L_2\theta_{2,\xi}, \tag{25}$$

$$b_{2,\eta} = 4L_2\theta_{2,\eta}, \tag{26}$$

where $\theta_{2,\xi}$ and $\theta_{2,\eta}$ are changes in orientation of plane mirror 160 in the plane and orthogonal to the plane, respectively, of FIG. 3.

It is evident from Equation (24) that beam shears $b_{2,\xi,T}$ and $b_{2,\eta,T}$ of output beam 120 are reduced relative to the corresponding beam shears of components of beam 116 according to the formulae $$b_{2,\xi,T} = \frac{u_{B,F}^2}{v_B^2} b_{2,\xi}, \tag{27}$$

$$b_{2,\eta,T} = \frac{v_{B,F}^2}{v_B^2} b_{2,\eta}. \tag{28}$$

The amplitude $A_{2,H}$ of electrical interference signal 142 is obtained by integrating the product of amplitudes $A_{2,r,T}$ and $A_{2,m,T}$ over the $\xi$ and $\eta$ coordinates wherein the amplitudes are given by Equations (23) and (24). The resulting expression for $A_{2,H}$ is $$A_{2,H} = A_{2,H,0}\left(\frac{\sqrt{2}\,u_{2B,2F}}{u_B}\right)\left(\frac{\sqrt{2}\,v_{2B,2F}}{v_B}\right) \times \tag{29}$$

$$\exp\left[-\left(\frac{u_{2B,2F}}{u_{B,2F}}\right)^2\left(\frac{b_{2,\xi}}{u_B}\right)^2 - \left(\frac{v_{2B,2F}}{v_{B,2F}}\right)^2\left(\frac{b_{2,\eta}}{v_B}\right)^2\right]$$

where

-continued $$\frac{1}{u_{B,2F}^2} = \frac{1}{u_B^2} + \frac{2}{u_F^2}, \quad (30)$$

$$\frac{1}{v_{B,2F}^2} = \frac{1}{v_B^2} + \frac{2}{v_F^2}, \quad (31)$$

$$\frac{1}{u_{2B,2F}^2} = \frac{2}{u_B^2} + \frac{2}{u_F^2}, \quad (32)$$

$$\frac{1}{v_{2B,2F}^2} = \frac{2}{v_B^2} + \frac{2}{v_F^2}, \quad (33)$$

and $A_{2,H,0}$ is amplitude electrical interference signal 142 for the case $u_F = v_F = \infty$. The effects of $\phi_{2r}$ and $\phi_{2m}$ on amplitude $A_{2,H}$ have been set to zero in obtaining Equation (29).

The reduction of beam shear of the measurement beam of beam 120 and the amplitude ratio $A_{2,H}/A_{2,H,0}$ for the case of $u_F = u_F$, $v_F = \infty$ using Equations (27), (28), and (29) are $$b_{2,\xi,T} = \left(\frac{1}{2}\right) b_{2,\xi}, \quad (34)$$

$$b_{2,\eta,T} = b_{2,\eta}, \quad (35)$$

$$\left(\frac{A_{2,H}}{A_{2,H,0}}\right) = \left(\frac{1}{2}\right)^{\frac{1}{2}} \exp\left[-\left(\frac{3}{4}\right)\left(\frac{b_\xi}{u_B}\right)^2 - \left(\frac{b_\eta}{v_B}\right)^2\right]. \quad (36)$$

The reduction of beam shear of the measurement beam of beam 20 and the amplitude ratio $A_{1,H}/A_{1,H,0}$ for the case of $u_B = u_F = v_B = v_F$ using Equations (27), (28), and (29) are $$b_{2,\xi,T} = \left(\frac{1}{2}\right) b_{2,\xi}, \quad (37)$$

$$b_{2,\eta,T} = \left(\frac{1}{2}\right) b_{2,\eta}, \quad (38)$$

$$\left(\frac{A_{2,H}}{A_{2,H,0}}\right) = \left(\frac{1}{2}\right) \exp\left[-\left(\frac{3}{4}\right)\left(\frac{b_\xi}{u_B}\right)^2 - \left(\frac{3}{4}\right)\left(\frac{b_\eta}{v_B}\right)^2\right]. \quad (39)$$

Figure 4:
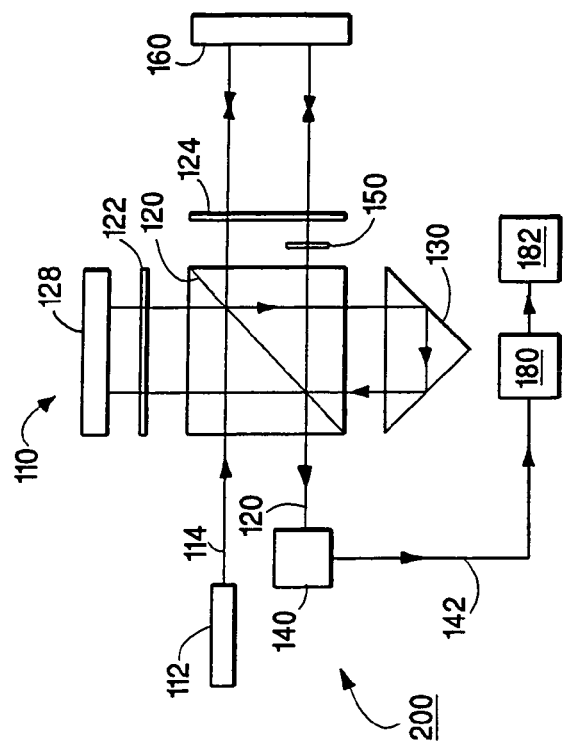
FIG. 4 is a schematic diagram of the interferometry system shown in FIG. 3 with the spatial filter in a different position.

Referring to FIG. 4, in some embodiments, spatial filter 150 can alternatively be placed between HSMPI 110 and measurement object 160. Assuming again, for illustrative purposes, that spatial filter 150 has a Gaussian transmission function and the measurement and reference beams have Gaussian profiles, amplitudes $A_{3,r,T}(\xi, \eta)$ and $A_{3,m,T}(\xi, \eta)$ of the reference and measurement beams, respectively, of output beam 120 are $$A_{3,r}(\xi, \eta) = A_0 \exp\left\{-\left(\frac{\xi}{u_B}\right)^2 - \left(\frac{\eta}{v_B}\right)^2\right\}, \quad (40)$$

$$A_{3,m,T}(\xi, \eta) = T^{\frac{1}{2}}(\xi, \eta) A_{3,m}(\xi, \eta) = \quad (41)$$

$$A_0 \exp\left\{\begin{array}{l} -\left[\xi - \left(\frac{1}{2}\right)\left(\frac{u_{B,2F}}{u_{2B,F}}\right)^2 b_{3,\xi}\right]^2 \left(\frac{1}{u_{B,2F}}\right)^2 - \\ \left(\frac{1}{4}\right)\left(\frac{u_{B,F}}{u_F}\right)^2 \left[1 + \left(\frac{u_B u_{B,2F}}{u_{2B,F}^2}\right)^2\right]\left(\frac{b_{3,\xi}}{u_B}\right)^2 - \\ \left[\eta - \left(\frac{1}{2}\right)\left(\frac{v_{B,2F}}{v_{2B,F}}\right)^2 b_{3,\eta}\right]^2 \left(\frac{1}{v_{B,2F}}\right)^2 - \\ \left(\frac{1}{4}\right)\left(\frac{v_{B,F}}{v_F}\right)^2 \left[1 + \left(\frac{v_B v_{B,2F}}{v_{2B,F}^2}\right)^2\right]\left(\frac{b_{3,\eta}}{v_B}\right)^2 + i\varphi_3' \end{array}\right\}.$$

where phase $\phi'_3$ is the net effect of the double pass of the measurement beam through spatial filter 150.

Beam shears $b_{3,\xi}$ and $b_{3,\eta}$ are the beam shears that would be exhibited at detector 140 if spatial filter 150 were removed and are $$b_{3,\xi} = 4L_3 \theta_{3,\xi}, \quad (42)$$

$$b_{3,\eta} = 4L_2 \theta_{3,\eta}, \quad (43)$$

where $\theta_{3,\xi}$ and $\theta_{3,\eta}$ are changes in orientation of plane mirror 160 in the plane and orthogonal to the plane, respectively, of FIG. 4.

It is evident from Equation (41) that beam shears $b_{3,\xi,T}$ and $b_{3,\eta,T}$ of the measurement beams of output beam 120 are reduced relative shears $b_{3,\xi}$ and $b_{3,\eta}$, respectively, according to the formulae $$b_{3,\xi,T} = \left(\frac{1}{2}\right)\left(\frac{u_{B,2F}}{u_{2B,F}}\right)^2 b_{3,\xi}, \quad (44)$$

$$b_{3,\eta,T} = \left(\frac{1}{2}\right)\left(\frac{v_{B,2F}}{v_{2B,F}}\right)^2 b_{3,\eta}. \quad (45)$$

The amplitude $A_{3,H}$ of electrical interference signal 142 is obtained by integrating the product of amplitudes $A_{3,r}$ and $A_{3,m,T}$ over the $\xi$ and $\eta$ coordinates wherein the amplitudes are given by Equations (40) and (41). The resulting expression for $A_{3,H}$ is $$A_{3,H} = A_{3,H,0} \left(\frac{\sqrt{2} u_{2B,2F}}{u_B}\right)\left(\frac{\sqrt{2} v_{2B,2F}}{v_B}\right) \times \exp \quad (46)$$

$$\left\{\begin{array}{l} -\left(\frac{1}{4}\right)\left[\left(\frac{u_{B,F}}{u_F}\right)^2 + \left(\frac{u_B u_{B,2F}}{u_{2B,F}^2}\right)^2\right]\left(\frac{b_{3,\xi}}{u_B}\right)^2 - \\ \left(\frac{1}{4}\right)\left[\left(\frac{v_{B,F}}{v_F}\right)^2 + \left(\frac{v_B v_{B,2F}}{v_{2B,F}^2}\right)^2\right]\left(\frac{b_{3,\eta}}{v_B}\right)^2 \end{array}\right\},$$

and $A_{3,H,0}$ is amplitude electrical interference signal 242 for the case $u_F = v_F = \infty$. The effects of $\phi'_3$ on amplitude $A_{3,H}$ have been set to zero in obtaining Equation (46) to show in a simple example basic properties of the invention without departing from the scope and spirit of the invention.

The reduction of beam shear of the measurement beam of beam 120 and the amplitude ratio $A_{3,H}/A_{3,H,0}$ for the case of $u_F = u_F$, $v_F = \infty$ using Equations (44), (45), and (46) are $$b_{3,\xi,T} = \left(\frac{1}{2}\right)b_{3,\xi}, \quad (47)$$

$$b_{3,\eta,T} = b_{3,\eta}, \quad (48)$$

$$\left(\frac{A_{3,H}}{A_{3,H,0}}\right) = \left(\frac{1}{2}\right)^{\frac{1}{2}} \exp\left[-\left(\frac{11}{16}\right)\left(\frac{b_\xi}{u_B}\right)^2 - \left(\frac{1}{2}\right)\left(\frac{b_\eta}{v_B}\right)^2\right]. \quad (49)$$

The reduction of beam shear of the measurement beam of beam 120 and the amplitude ratio $A_{3,H}/A_{3,H,0}$ for the case of $u_B=u_F=v_B=v_F$ using Equations (44), (45), and (46) are $$b_{3,\xi,T} = \left(\frac{1}{2}\right)b_{3,\xi}, \quad (50)$$

$$b_{3,\eta,T} = \left(\frac{1}{2}\right)b_{3,\eta}, \quad (51)$$

$$\left(\frac{A_{3,H}}{A_{3,H,0}}\right) = \left(\frac{1}{2}\right)\exp\left[-\left(\frac{11}{16}\right)\left(\frac{b_\xi}{u_B}\right)^2 - \left(\frac{11}{16}\right)\left(\frac{b_\eta}{v_B}\right)^2\right]. \quad (52)$$

Although the foregoing embodiments all utilize interferometry systems that monitor one degree of freedom of a measurement object (e.g., displacement of the measurement object along one axis), spatial filters can be employed to reduce the effects of beam shear in systems that monitor more than one degree of freedom. For example, spatial filters can be used in interferometry systems that monitor more than one degree of freedom of the measurement object. One example of such a system 300 is shown in FIG. 5(a). System 300 includes an interferometer indicated at numeral 310 that measures two degrees of freedom of plane mirror measurement object 360, namely the displacement of the measurement object along an axis parallel to the measurement beams and the orientation of the measurement object about an axis perpendicular to the plane of FIG. 5(a). Interferometer 310 includes a polarizing beam splitter 320, a reference mirror 328, a retroreflector 330, and quarter wave plates 322 and 324. Additionally, interferometer 310 includes mirrors 369A, 369B, and 369C, half wave plate 362, beam splitter 368, retroreflector 370 and an afocal system 365. A spatial filter 350 is placed between polarizing beam splitter 320 and beam splitter 368. Interferometer 310 and measurement object 360 are separated by a distance $L_4$.

During operation, polarizing beam splitter 320 reflects a first component of an input beam 314 towards reference mirror 328, while transmitting a second orthogonal component which reflects from measurement object 360. Both components are reflected back towards polarizing beam splitter 320. Quarter waveplates 322 and 324 respectively cause the polarization state of each component to be rotated through 90°, so that polarizing beam splitter 320 now transmits the first component but reflects the second component. Mirrors 369A, 369B, and 369C relay both components back towards polarizing beam splitter 320. Before the component beams contact the polarizing beam splitter again, half wave plate 362 rotates the component beams polarization through 90°, so that the polarizing beam splitter directs the first component to reflect from measurement object 360 while transmitting the second component towards reference mirror 328. The reflected component beams are then combined at polarizing beam splitter 320 and exit the interferometer as output beam 316. Non-polarizing beam splitter 368 directs a first portion of output beam 316 towards detector 340. Detector 340 includes an analyzer, which samples a linear polarization state of output beam 316. Detector 340 monitors the intensity of the sample polarization state.

Thus, both the first and second beams contact the measurement object once, at difference locations. These locations are separated by a known amount, $b_4$. The phase of the detected intensity signal is related to the path length difference between the first and second beams, which is related to the orientation of the measurement object.

A second portion of the output beam is transmitted by beam splitter 368 and the second portion is subsequently reflected by retroreflector. 370 and then transmitted by an afocal system 365 as a second input beam for interferometer 310. The afocal system has a magnification of 2:1. Hence, any angular deviation ($\alpha$) introduced in the output beam from the angular displacement interferometer caused by non-normal reflection from the measurement object will be reduced to $\alpha/2$. The resulting angular deviation ensures that the directions of propagation of the measurement beams of the interferometer at plane mirror measurement object 360 are orthogonal to the surface of the plane mirror measurement object. Examples of afocal systems are described below.

Interferometer 310 splits the second input beam into a measurement beam and a reference beam. The interferometer directs the measurement beam to reflect from measurement object 360 twice, and directs the reference beam to reflect from reference mirror 328 twice before combining the measurement and reference beams to form output beam 1320. A detector 1340 monitors the intensity of a sampled polarization state of output beam 1320. The phase of the detected intensity signal is related to the displacement of measurement object 360 with respect to interferometer 310.

Figure 5B:
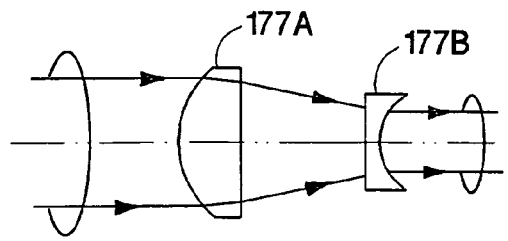
FIG. 5(*a*) is a schematic diagram of a further interferometry system including a spatial filter.
Figure 5C:
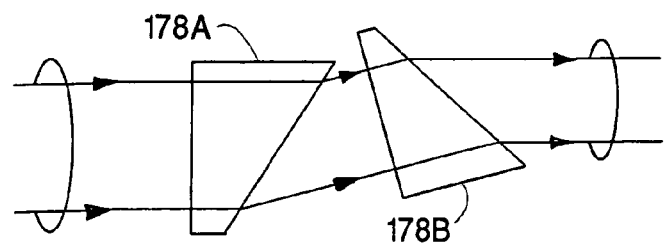
Figure 5D:
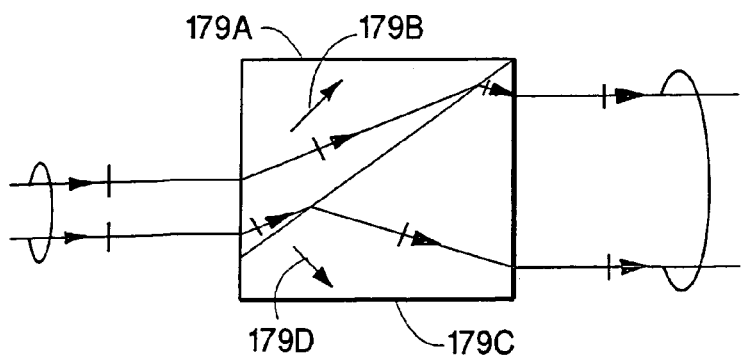
Figure 5A:
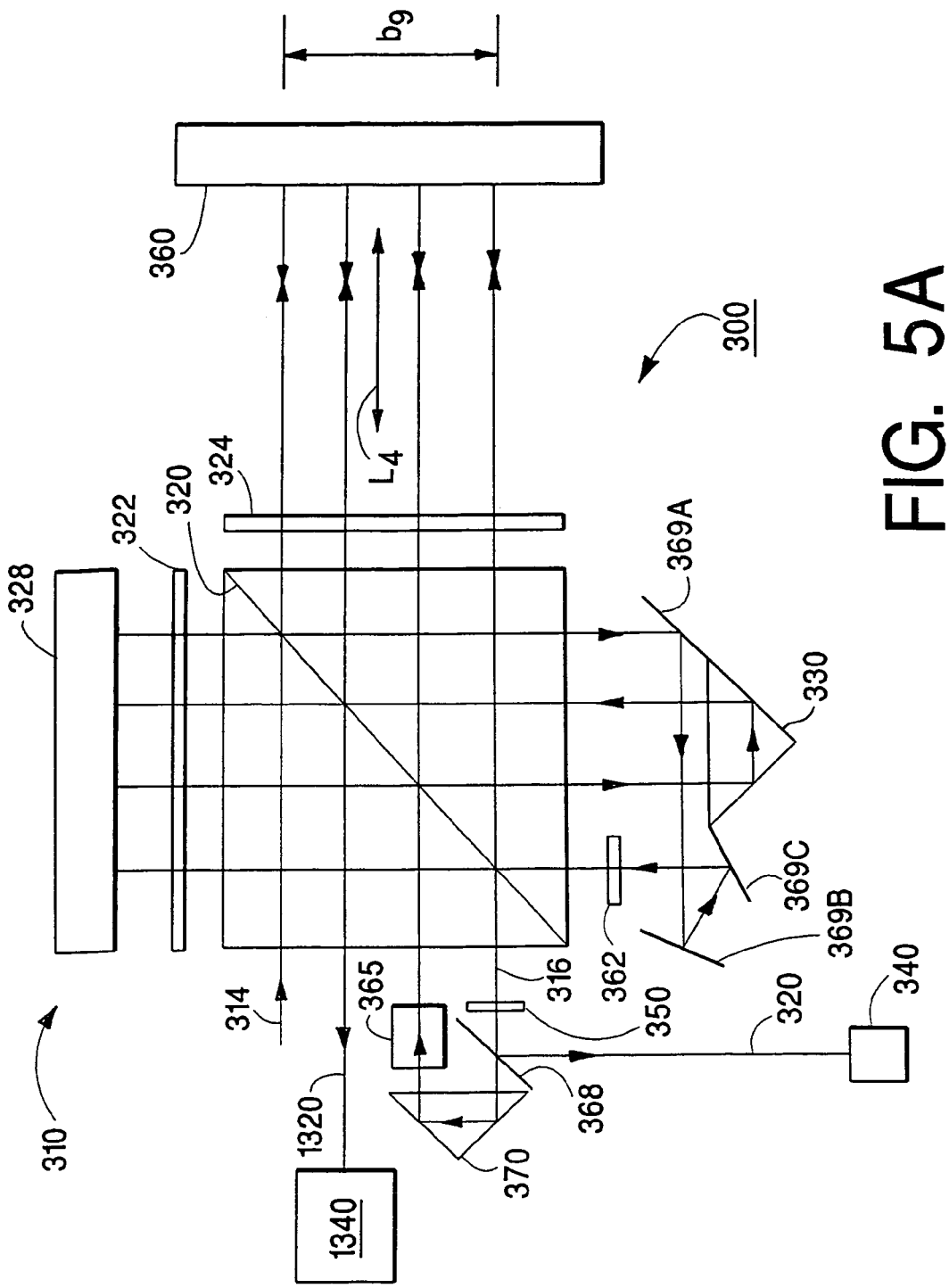

An example of a Galilean afocal lens is shown diagrammatically in FIG. 5(b) and a prismatic and birefringent anamorphic afocal attachments are shown diagrammatically in FIGS. 5(c) and 5(d), respectively. The Galilean afocal lens shown in FIG. 5(b) include positive and negative lenses 177A and 177B, respectively, and illustrates its operation in a demagnifying mode.

A prismatic anamorphic afocal attachment, shown in FIG. 5(c), includes two prisms 178A and 178B and also illustrates its operation in a demagnifying mode.

A birefringent anamorphic afocal attachment, shown in FIG. 5(d), includes two birefringent prisms 179A and 179C bonded together and illustrates its operation in a magnifying mode. The birefringent prisms may include, for example, uniaxial crystals such as calcite and paratellurite. The optic axes for birefringent prisms 179A and 179C are shown in FIG. 5(d) as elements 179B and 179D, respectively. Polarization of the input beam is extraordinary. The path of the input beam through the birefringent anamorphic afocal attachment and the directions for the optic axes 179B and 179D are shown for a system comprising positive uniaxial crystals wherein the ordinary index of refraction is less than the extraordinary index of refraction.

To illustrate the effect of spatial filter 150 on beam shear, assume that the first and second component beams have Gaussian profiles, and the spatial filter has a Gaussian transmission profile. Amplitudes $A_{4,r,T}(\xi, \eta)$ and $A_{4,m,T}(\xi, \eta)$ of the first and second component beams, respectively, of beam 320 are $$A_{4,r,T}(\xi, \eta) = \quad (53)$$

$$T^{1/2}(\xi, \eta) A_{4,r}(\xi, \eta) =$$

$$A_0 \exp \left\{ \begin{array}{l} -\left[\xi - \left(\frac{u_{B,F}^2}{u_B^2}\right) b_{4,\xi}\right]^2 \left(\frac{1}{u_{B,F}}\right)^2 - \left(\frac{u_{B,F}}{u_F}\right)^2 \left(\frac{b_{4,\xi}}{u_B}\right)^2 \\ -\left[\eta - \left(\frac{v_{B,F}^2}{v_B^2}\right) b_{4,\eta}\right]^2 \left(\frac{1}{v_{B,F}}\right)^2 - \left(\frac{v_{B,F}}{v_F}\right)^2 \left(\frac{b_{4,\eta}}{v_B}\right)^2 + i\frac{\varphi_4}{2} \end{array} \right\},$$

$$A_{4,m,T}(\xi, \eta) = \quad (54)$$

$$T^{1/2}(\xi, \eta) A_{4,m}(\xi, \eta) =$$

$$A_0 \exp \left\{ \begin{array}{l} -\left[\xi - \left(\frac{u_{B,F}^2}{u_B^2}\right) b_{4,\xi}\right]^2 \left(\frac{1}{u_{B,F}}\right)^2 - \left(\frac{u_{B,F}}{u_F}\right)^2 \left(\frac{b_{4,\xi}}{u_B}\right)^2 \\ -\left[\eta - \left(\frac{v_{B,F}^2}{v_B^2}\right) b_{4,\eta}\right]^2 \left(\frac{1}{v_{B,F}}\right)^2 - \left(\frac{v_{B,F}}{v_F}\right)^2 \left(\frac{b_{4,\eta}}{v_B}\right)^2 + i\frac{\varphi_4}{2} \end{array} \right\}.$$

where $A_{4,r}(\xi, \eta)$ and $A_{4,m}(\xi, \eta)$ are the profiles of the first and second beams of beam 316.

Beam shears $b_{4,\xi}$ and $b_{4,\eta}$ that would be exhibited at detector 340 if spatial filter 350 were removed and are $$b_{4,\xi} = 2L_4 \theta_{4,\xi}, \quad (55)$$

$$b_{4,\eta} = 2L_4 \theta_{4,\eta}, \quad (56)$$

where $\theta_{4,\xi}$ and $\theta_{4,\eta}$ are changes in orientation of plane mirror 360 in the plane and orthogonal to the plane, respectively, of FIG. 4.

It is evident from Equations (53) and (54) that beam shears $b_{4,\xi,T}$ and $b_{4,\eta,T}$ of components of beam 320 are reduced relative to corresponding beam shears of beam 316 according to the formulae $$b_{4,\xi,T} = \frac{u_{B,F}^2}{u_B^2} b_{4,\xi}, \quad (57)$$

$$b_{4,\eta,T} = \frac{v_{B,F}^2}{v_B^2} b_{4,\eta}, \quad (58)$$

A corresponding reduction of beam shears is also exhibited for components of beam 1320.

The amplitude $A_{4,H}$ of electrical interference signal 342 is obtained by integrating the product of amplitudes $A_{4,r,T}$ and $A_{4,m,T}$ over the $\xi$ and $\eta$ coordinates wherein the amplitudes are given by Equations (53) and (54). The resulting expression for $A_{4,H}$ is $$A_{4,H} = A_{4,H,0} \left(\frac{\sqrt{2} \, u_{2B,2F}}{u_B}\right) \left(\frac{\sqrt{2} \, v_{2B,2F}}{v_B}\right) \times \quad (59)$$

$$\exp\left[-4\left(\frac{u_{2B,2F}}{u_F}\right)^2 \left(\frac{b_{4,\xi}}{u_B}\right)^2 - 4\left(\frac{v_{2B,2F}}{v_F}\right)^2 \left(\frac{b_{4,\eta}}{v_B}\right)^2\right]$$

where $A_{4,H,0}$ is amplitude electrical interference signal 342 for the case $u_F = v_F = \infty$. The effects of $\phi_4$ on amplitude $A_{4,H}$ have been set to zero in obtaining Equation (59) to show in a simple example basic properties of the invention without departing from the scope and spirit of the invention.

The value for the reduction of beam shear of the measurement beam of beam 320 and the amplitude ratio $A_{4,H}/A_{4,H,0}$ for the case of $u_F = u_F$, $v_F = \infty$ using Equations (57), (58), and (59) are $$b_{4,\xi,T} = \left(\frac{1}{2}\right) b_{4,\xi}, \quad (60)$$

$$b_{4,\eta,T} = b_{4,\eta}, \quad (61)$$

$$\left(\frac{A_{4,H}}{A_{4,H,0}}\right) = \left(\frac{1}{2}\right)^{1/2} \exp\left[-\left(\frac{b_\xi}{u_B}\right)^2\right]. \quad (62)$$

The values for the reduction of beam shear of the measurement beam of beam 320 and the amplitude ratio $A_{4,H}/A_{4,H,0}$ for the case of $u_B = u_F = v_B = v_F$ using Equations (57), (58), and (59) are $$b_{4,\xi,T} = \left(\frac{1}{2}\right) b_{4,\xi}, \quad (63)$$

$$b_{4,\eta,T} = \left(\frac{1}{2}\right) b_{4,\eta}, \quad (64)$$

$$\left(\frac{A_{4,H}}{A_{4,H,0}}\right) = \left(\frac{1}{2}\right) \exp\left[-\left(\frac{b_\xi}{u_B}\right)^2 - \left(\frac{b_\eta}{v_B}\right)^2\right]. \quad (65)$$

Note that the $(b_{4,\xi}/u_B)^2$ and $(b_{4,\eta}/u_B)^2$ in the exponent of equations for $A_{4,H}/A_{4,H,0}$ is generally a smaller term by a factor of 4 compared to the corresponding terms encountered in the first, second, and third embodiments (compare Equations (55) and (56) to Equations (7) and (8), Equations (25) and (26), and Equations (42) and (43).

Other examples of interferometry systems for measuring more than one degree of freedom and for reducing beam shear are described in U.S. patent application Ser. No. 10/352,616 filed Jan. 28, 2003 and entitled "MULTIPLE-PASS INTERFEROMETRY" by Henry A. Hill. Other forms of multiple pass interferometers such as described in an article entitled "Differential interferometer arrangements for distance and angle measurements: Principles, advantages and applications" by C. Zanoni, *VDI Berichte Nr.* 749, 93-106 (1989) may also be characterized using system 100 and/or 300.

Although the foregoing embodiments are with reference to HSPMI's, in general, spatial filters can be used to reduce the effects of beam shear in other types of interferometer, such as single pass interferometers. Moreover, spatial filters can be used with interferometers that can include additional components to condition, redirect, or otherwise manipulate the input beam, output beam, or measurement beam. An example of interferometers that includes such additional component(s) are dynamic interferometers. Examples of dynamic interferometers are described in U.S. patent application Ser. No. 10/226,591 filed Aug. 23, 2002 and entitled "DYNAMIC INTERFEROMETER CONTROLLING DIRECTION OF INPUT BEAM" by Henry A. Hill. Typically, a dynamic interferometer includes a component called a beam steering element. A beam steering element is an element capable of changing the propagation direction a beam, usually in response to a signal based on the direction of the beam it is steering. An example of a beam steering element is a mirror coupled to a transducer that changes the orientation of the mirror based on a control signal. In dynamic interferometers, beam steering elements function to maintain the orientation of the measurement beam substantially orthogonal to a plane mirror measurement object by adjusting the direction of the measurement beam in response to changes in the orientation of the measurement object. The beam steering element may do this by contacting the input beam or measurement beam. In some embodiments, the beam steering element contacts the output beam as well.

Spatial filters can also be used to reduce the effect of beam shear in dispersion interferometers (e.g., two-wavelength dispersion interferometers). Examples of two-wavelength dispersion interferometers are described in U.S. Pat. No. 6,219,144 B1 entitled "APPARATUS AND METHOD FOR MEASURING THE REFRACTIVE INDEX AND OPTICAL PATH LENGTH EFFECTS OF AIR USING MULTIPLE-PASS INTERFEROMETRY" by Henry A. Hill, Peter de Groot, and Frank C. Demarest and U.S. Pat. No. 6,327,039 B1 by Peter de Groot, Henry A. Hill, and Frank C. Demarest.

In some embodiments, the interferometer output beam is transported to a remotely located detector using a fiber optic pickup (FOP). Spatial filters can be used to reduce beam shear of one or more beams in the output beam prior to coupling the output beam into the FOP. Examples of interferometry systems that utilize FOP's are described, for example, in U.S. patent application Ser. No. 09/599,348, entitled "INTERFEROMETRY SYSTEM HAVING A DYNAMIC BEAM-STEERING ASSEMBLY FOR MEASURING ANGLE AND DISTANCE AND EMPLOYING OPTICAL FIBERS FOR REMOTE PHOTOELECTRIC DETECTION," filed Jun. 20, 2000, by Henry A. Hill.

While the use of a spatial filter can reduce non-cyclic errors by reducing beam shear, other sources of error can also contribute to uncertainty in interferometry measurements. For example, another potential source of errors are time-varying effects of gas in the path of the measurement beam. In some embodiments, in addition to using a spatial filter, interferometry systems can compensate for these errors using techniques described in U.S. patent application Ser. No. 10/294,158 entitled "COMPENSATING FOR EFFECTS OF VARIATIONS IN GAS REFRACTIVITY IN INTERFEROMETERS," filed Nov. 14, 2002, U.S. patent application Ser. No. 10/309,394 entitled "COMPENSATING FOR EFFECTS OF NON-ISOTROPIC GAS MIXTURES IN INTERFEROMETERS," filed on Dec. 3, 2002 and U.S. patent application Ser. No. 10/350,522 entitled "METHOD AND APPARATUS FOR COMPENSATION OF TIME-VARYING OPTICAL PROPERTIES OF GAS IN INTERFEROMETERY" filed Jan. 24, 2003, all by Henry A. Hill.

Non-cyclic errors can be further reduced by pre-characterizing errors in the system using techniques disclosed in U.S. patent application Ser. No. 10/366,587, entitled "CHARACTERIZATION AND COMPENSATION OF NON-CYCLIC ERRORS IN INTERFEROMETRY SYSTEMS," and U.S. patent application Ser. No. 10/366,676, entitled "METHOD AND APPARATUS TO MEASURE FIBER OPTIC PICKUP ERRORS IN INTERFEROMETRY SYSTEMS," both filed Feb. 12, 2003, both by Henry A. Hill.

The observed phase can also be compensated for contributions from cyclic errors. In order to compensate for these contributions, a cyclic error compensating system can be used to determine a cyclic error function characterizing the cyclic error contribution to the observed phase for the interferometer. Examples of cyclic error compensating systems are described in U.S. patent application Ser. No. 10/287,898 entitled "INTERFEROMETRIC CYCLIC ERROR COMPENSATION" filed Nov. 5, 2002 by Henry A. Hill, and U.S. patent application Ser. No. 10/174,149 and entitled "INTERFEROMETRY SYSTEM AND METHOD EMPLOYING AN ANGULAR DIFFERENCE IN PROPAGATION BETWEEN ORTHOGONALLY POLARIZED INPUT BEAM COMPONENTS" filed Jun. 17, 2002 by Peter de Groot and Henry A. Hill.

The interferometry systems described above provide highly accurate measurements. Such systems can be especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules), see for example the *Semiconductor Industry Roadmap*, p82 (1997).

Overlay depends directly on the performance, i.e. accuracy and precision, of the distance measuring interferometers used to position the wafer and reticle (or mask) stages. Since a lithography tool may produce $50-100 M/year of product, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

Interferometry systems are important components of the positioning mechanisms that control the position of the wafer and reticle, and register the reticle image on the wafer. If such interferometry systems include the features described above, the accuracy of distances measured by the systems increases as error contributions to the distance measurement are minimized.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

An example of a lithography scanner 1100 using an interferometry system 1126 is shown in FIG. 5a. The interferometry system is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1104 is a support base 1113 that carries wafer stage 1122. Stage 1122 includes a plane mirror 1128 for reflecting a measurement beam 1154 directed to the stage by interferometry system 1126. A positioning system for positioning stage 1122 relative to interferometry system 1126 is indicated schematically by element 1119. Positioning system 1119 can include, e.g., piezoelectric transducer elements and corresponding control electronics. The measurement beam reflects back to the interferometry system, which is mounted on exposure base 1104. The interferometry system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 1126 directs the reference beam (not shown) along an external reference path that contacts a reference mirror (not shown) mounted on some structure that directs the radiation beam e.g., lens housing 1106. The reference mirror reflects the reference beam back to the interferometry system. The interference signal produce by interferometry system 1126 when combining measurement beam 1154 reflected from stage 1122 and the reference beam reflected from a reference mirror mounted on the lens housing 1106 indicates changes in the position of the stage relative to the radiation beam. Furthermore, in other embodiments the interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

As is well known in the art, lithography is a critical part of manufacturing methods for making semiconducting devices. For example, U.S. Pat. No. 5,483,343 outlines steps for such manufacturing methods. These steps are described below with reference to FIGS. 5b and 5c. FIG. 5b is a flow chart of the sequence of manufacturing a semiconductor device such as a semiconductor chip (e.g. IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

FIG. 5c is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 6:
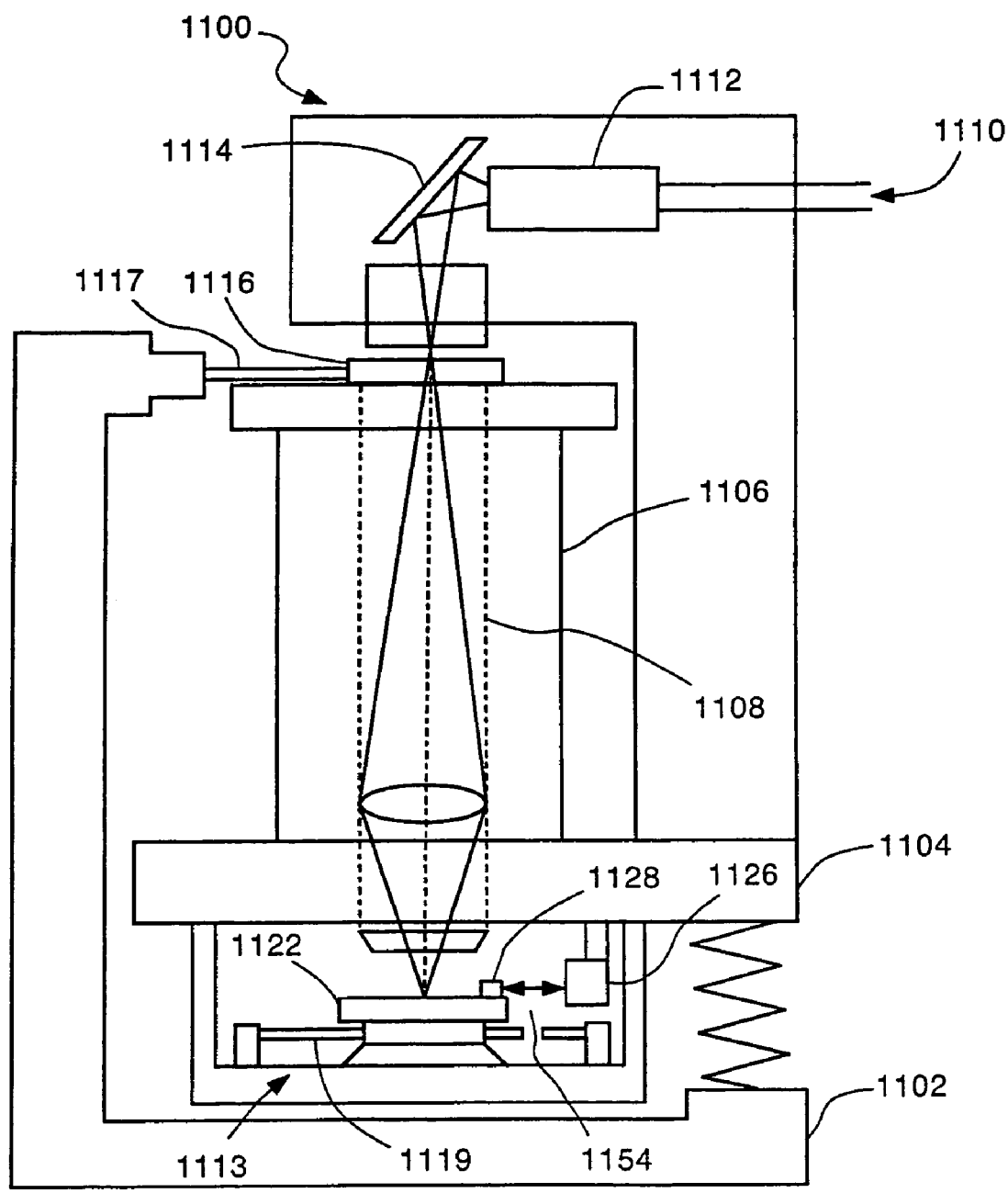
FIG. 6 is a schematic diagram of a lithography system that includes interferometry system and is used to make integrated circuits.
Figure 7:
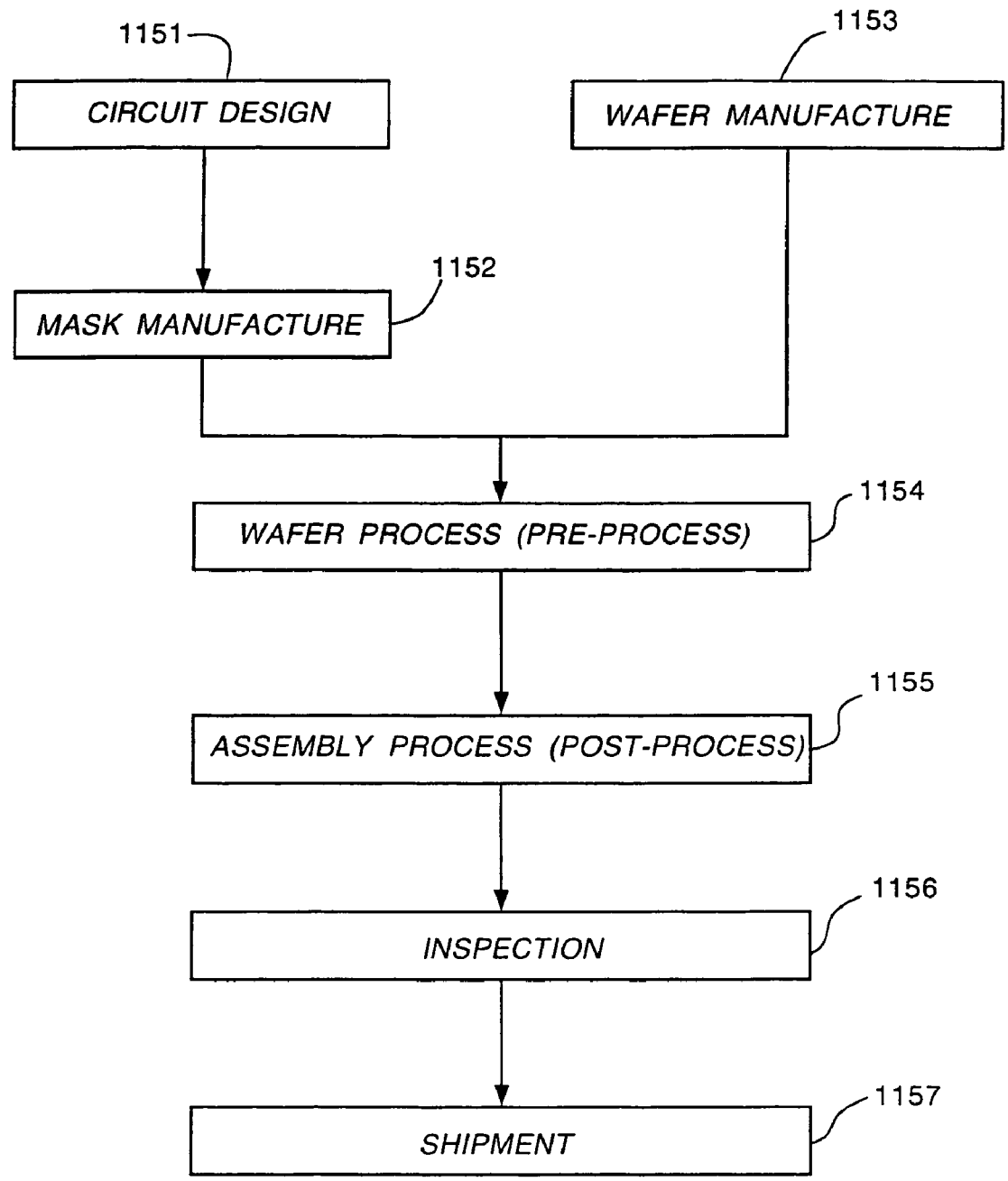
FIG. 7 and FIG. 8 are flow charts that describe steps for making integrated circuits.
Figure 8:
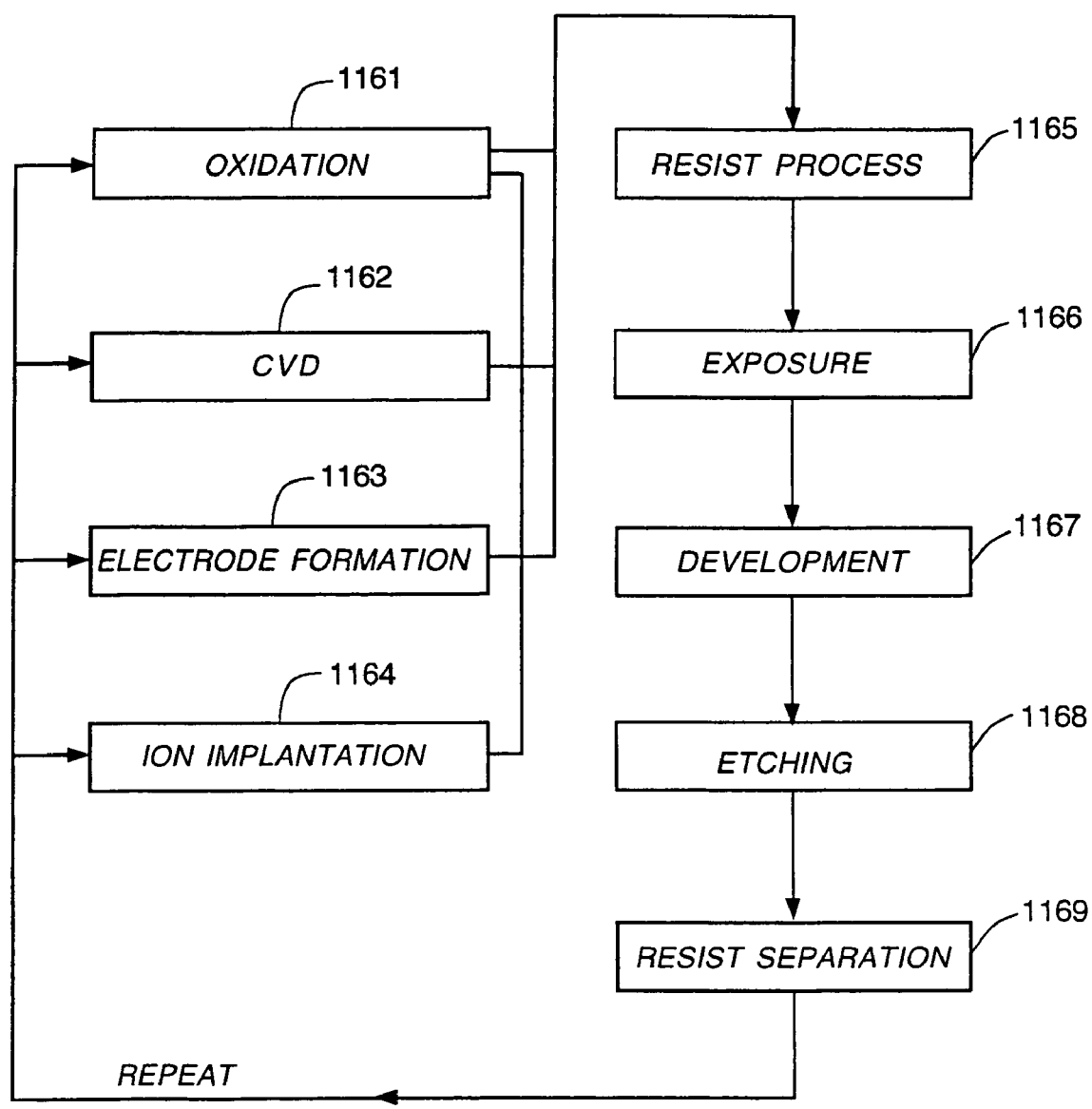
Figure 9:
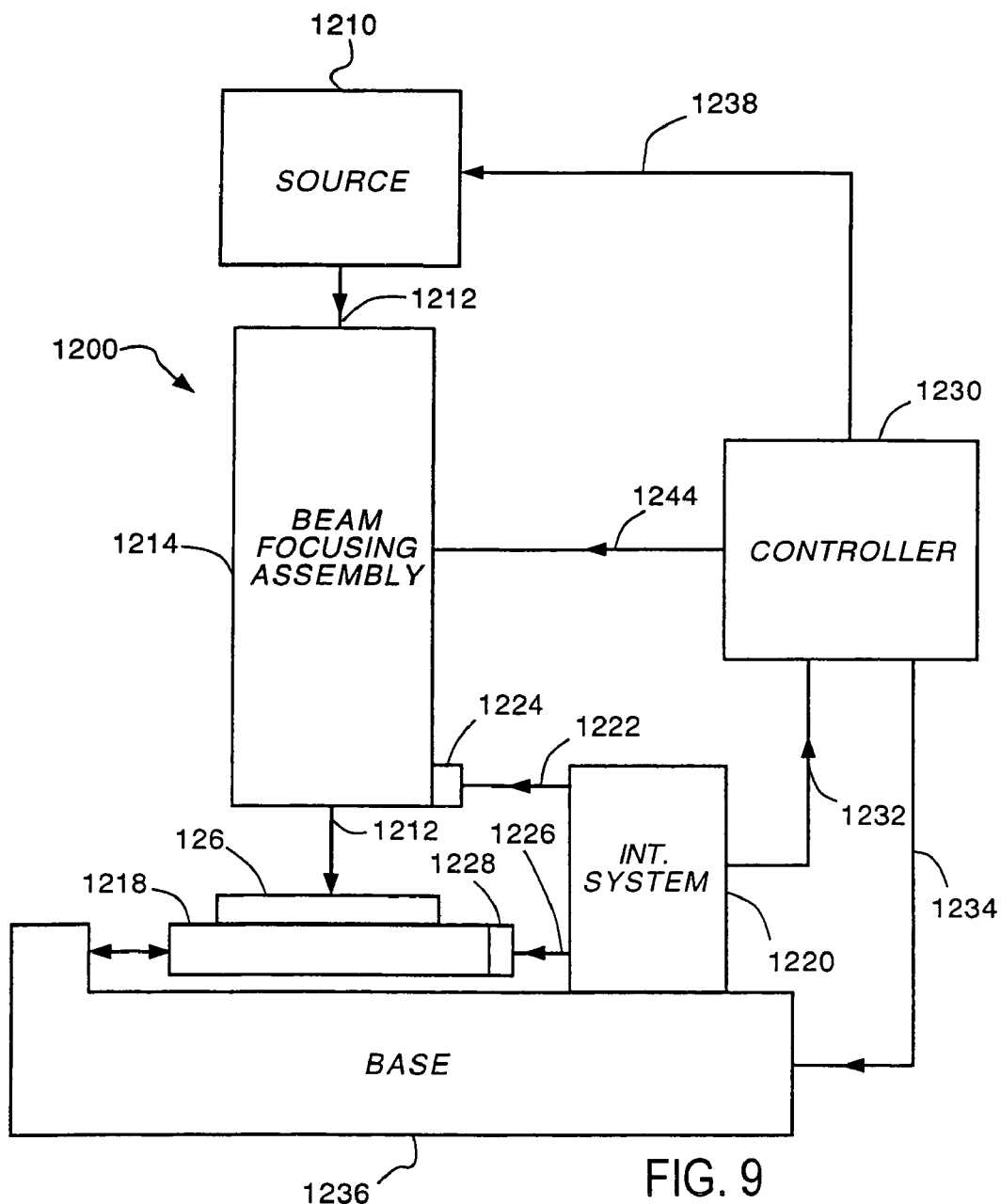
FIG. 9 is a schematic diagram of a beam writing system that includes an interferometry system.

As an example, a schematic of a beam writing system 1200 is shown in FIG. 6. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted-on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam. 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate.

Furthermore, in some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

A number of embodiments of the invention have been described. Nevertheless, it will be understood that various modifications may be made without departing from the spirit and scope of the invention. For example, although the foregoing embodiment of a spatial filter includes pair of lenses and a pinhole aperture, other components can be used. The spatial filter can include one or more additional or alternative optical components (e.g., diffractive, refractive, and/or holographic component(s)) to reduce deviations of the measurement beam from the nominal measurement beam path. Accordingly, other aspects, advantages, and modifications are within the scope of the following claims.

What is claimed is:

1. A method, comprising:
    directing a first beam and a second beam along respective paths, wherein the first beam contacts a measurement object and wherein the first and second beams are derived from a common source;
    passing the first beam through an aperture after it contacts the measurement object; and
    combining the first and second beams to form an output beam, wherein the output beam comprises information about an optical path length difference between the first and second beams.

2. The method of claim 1, wherein changes in the orientation of the measurement object cause a displacement of the first beam from a nominal beam path.

3. The method of claim 2, wherein the spatial filtering reduces the displacement of the first beam from the nominal beam path.

4. The method of claim 3, wherein the nominal path corresponds to the first beam path when the measurement object is in a reference oriented.

5. The method of claim 4, wherein the first beam is normally incident on the measurement object when the measurement object is in the reference orientation.

6. The method of claim 2, wherein the displacement of the first beam from the nominal beam path causes a measurable interferometric phase derived from the output beam to deviate from the expression $\Phi=pknL$, where p is an integer, k is the wavenumber of the output beam, and nL corresponds to the optical path length difference.

7. The method of claim 6, wherein the deviation comprises a non-cyclic error term that varies in a nonperiodic way on the optical path length difference.

8. The method of claim 1, wherein the first and second beams are directed along separate paths by an interferometer.

9. The method of claim 8, wherein the interferometer is a high stability plane mirror interferometer.

10. The method of claim 1, wherein the first beam contacts the measurement object more than once.

11. The method of claim 10, wherein the first beam contacts the measurement object twice.

12. The method of claim 1, wherein the measurement object is a plane mirror.

13. The method of claim 6, further comprising detecting the measurable interference phase and determining information related to the optical path length difference based on the detected phase.

14. The method of claim 13, wherein passing the measurement beam through the aperture reduces deviations of the phase from the expression $\Phi=pknL$.

15. The method of claim 13, wherein passing the measurement beam through the aperture reduces the contribution of a non-linear non-cyclic error term to the measurable phase.

16. The method of claim 1, wherein the first beam is passed through the aperture prior to being combined with the second beam.

17. The method of claim 1, wherein the first beam is passed through the aperture after being combined with the second beam.

18. An apparatus, comprising:
   an interferometer which during operation directs a first beam and a second beam along respective paths and then combines the first and second beams to produce an output beam, wherein the first beam contacts a measurement object and changes in the orientation of the measurement object cause a displacement of the first beam from a nominal beam path, and wherein the output beam comprises information about an optical path length difference between the first and second beams; and
   an aperture positioned in the path of the first beam to reduce the displacement of the first beam from the nominal beam path.

19. The apparatus of claim 18, further comprising a detector positioned to detect an intensity of the output beam.

20. The apparatus of claim 19, further comprising an electronic controller coupled to the detector, which during operation monitors an interference phase related to the optical path length difference between the first and second beams.

21. The apparatus of claim 18, wherein the displacement of the first beam from the nominal beam path causes a measurable interferometric phase derived from the output beam to deviate from the expression $\Phi=pknL$, where p is an integer, k is the wavenumber of the output beam, and nL corresponds to the optical path length difference.

22. The apparatus of claim 21, wherein the deviation comprises a non-cyclic error term that varies in a nonperiodic way on the optical path length difference.

23. The apparatus of claim 18, wherein the interferometer directs the first beam to contact the measurement object more than once.

24. The apparatus of claim 23, wherein the interferometer directs the first beam to contact the measurement object twice.

25. The apparatus of claim 18, wherein the interferometer is a high stability plane mirror interferometer.

26. The apparatus of claim 18, wherein the nominal path corresponds to the path of the first beam when the measurement object is in a reference orientation.

27. The apparatus of claim 26, wherein the first beam is normally incident on the measurement object when the measurement object is in the reference orientation.

28. The apparatus of claim 18, wherein the aperture is positioned in the path of the output beam.

29. The apparatus of claim 18, further comprising a light source which during operation generates an input beam from which the interferometer derives the first and second beams.

30. A method for monitoring the position of a measurement object, comprising:
   directing a first beam and a second beam along respective paths, wherein the first beam contacts the measurement object and wherein the first and second beams are derived from a common source;
   passing the first beam through an aperture after it contacts the measurement object;
   combining the first and second beams to form an output beam;
   detecting a phase of the output beam related to an optical path length difference between the first and second beams; and
   monitoring the position of the measurement object based on the detected phase.

* * * * *